United States Patent
Wang et al.

(10) Patent No.: US 12,429,837 B2
(45) Date of Patent: Sep. 30, 2025

(54) DEVICE CONTROL METHOD, CONFLICT PROCESSING METHOD, CORRESPONDING APPARATUS AND ELECTRONIC DEVICE

(71) Applicant: Samsung Electronics Co., Ltd., Suwon-si (KR)

(72) Inventors: Lijie Wang, Beijing (CN); Huadong Wang, Beijing (CN); Mei Tu, Beijing (CN); Xiangfeng Meng, Beijing (CN); Yuntao Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 883 days.

(21) Appl. No.: 17/615,954

(22) PCT Filed: Jun. 5, 2020

(86) PCT No.: PCT/KR2020/007329
§ 371 (c)(1),
(2) Date: Dec. 2, 2021

(87) PCT Pub. No.: WO2020/246844
PCT Pub. Date: Dec. 10, 2020

(65) Prior Publication Data
US 2022/0317641 A1 Oct. 6, 2022

(30) Foreign Application Priority Data
Jun. 6, 2019 (CN) .......................... 201910493339.2

(51) Int. Cl.
*G05B 19/042* (2006.01)
(52) U.S. Cl.
CPC .... *G05B 19/042* (2013.01); *G05B 2219/2642* (2013.01)

(58) Field of Classification Search
USPC .......................................................... 700/28
See application file for complete search history.

(56) References Cited

U.S. PATENT DOCUMENTS

| 2003/0144845 A1* | 7/2003 | Lee .......................... G10L 15/22 704/E15.04 |
| 2014/0068027 A1 | 3/2014 | Flacco et al. |

(Continued)

FOREIGN PATENT DOCUMENTS

| CN | 105182786 A | 12/2015 |
| CN | 106682090 A | 5/2017 |

(Continued)

OTHER PUBLICATIONS

CN-1596029-A (Year: 2005).*

(Continued)

*Primary Examiner* — Hien D Khuu
(74) *Attorney, Agent, or Firm* — Jefferson IP Law, LLP

(57) ABSTRACT

The application provides a device control method, a conflict processing method, a corresponding apparatus, and an electronic device. The method includes: acquiring an input instruction of user; acquiring at least one of the following information: user information, environmental information, device information; determining at least one execution device of the input instruction based on the acquired information and the input instruction; controlling the at least one execution device to perform a corresponding operation. The present application can determine at least one optimal execution device by using at least one of the obtained input instruction and the user information, the environment information, and the device information when the user does not specify the specific execution device, thereby better responding to the user.

17 Claims, 24 Drawing Sheets

(56) References Cited

U.S. PATENT DOCUMENTS

| | | | |
|---|---|---|---|
| 2014/0078462 A1* | 3/2014 | Abreu | H04R 1/1016 |
| | | | 351/158 |
| 2015/0331396 A1* | 11/2015 | Sami | G05B 15/02 |
| | | | 700/275 |
| 2016/0189706 A1* | 6/2016 | Zopf | G10L 15/063 |
| | | | 704/254 |
| 2016/0330327 A1 | 11/2016 | Lee et al. | |
| 2017/0090442 A1* | 3/2017 | Chien | G06F 3/017 |
| 2017/0103755 A1 | 4/2017 | Jeon et al. | |
| 2017/0168469 A1 | 6/2017 | Marten et al. | |
| 2017/0205783 A1 | 7/2017 | Tannenbaum et al. | |
| 2017/0232300 A1 | 8/2017 | Tran et al. | |
| 2018/0211665 A1* | 7/2018 | Park | G10L 15/22 |
| 2018/0228006 A1* | 8/2018 | Baker | G06F 3/167 |
| 2019/0020493 A1* | 1/2019 | Arling | H04L 12/282 |
| 2019/0072290 A1 | 3/2019 | Stoner et al. | |
| 2019/0295542 A1* | 9/2019 | Huang | G06F 3/167 |
| 2020/0064458 A1* | 2/2020 | Giusti | G01S 13/426 |
| 2021/0035583 A1* | 2/2021 | Park | G03B 21/14 |
| 2021/0288831 A1 | 9/2021 | Edwards et al. | |

FOREIGN PATENT DOCUMENTS

| | | |
|---|---|---|
| CN | 107528753 A | 12/2017 |
| KR | 20180042577 A * | 4/2018 |

OTHER PUBLICATIONS

WO-2016206494-A1 (Year: 2016).*
WO-2019091171-A1 (Year: 2019).*
KR 20190016260 A (Year: 2019).*
KR_101662693_B1 (Year: 2016).*
CN_110597082_A (Year: 2019).*
CN_111161731_A (Year: 2020).*
CN_110703614_A (Year: 2020).*
Chinese Office Action dated Nov. 27, 2024, issued in Chinese Application No. 201910493339.2.

* cited by examiner

DEVICE CONTROL METHOD, CONFLICT PROCESSING METHOD, CORRESPONDING APPARATUS AND ELECTRONIC DEVICE

TECHNICAL FIELD

The present application relates to the field of smart device technologies, and in particular, to a device control method, a conflict processing method, a corresponding apparatus, and an electronic device.

BACKGROUND ART

With the development of information technology, various devices enter people's daily lives, such as air conditioners, televisions, washing machines, refrigerators and the like, users can control these devices to perform corresponding operations by manually adjusting keys on the device or remotely controlling buttons on the device.

With the further development of artificial intelligence technology, smart devices gradually enter people's daily lives, such as smart speakers, smart air conditioners, smart televisions and smart ovens and the like, users can control smart devices to perform corresponding functions without pressing keys on the device or remotely controlling the device. For example, the user can directly control the specified smart device through voice commands. In one example, when the user says "turn on the air cleaner", a specific device which is an air cleaner is specified in the voice command, and the air cleaner performs the turning on operation after receiving the command. In another example, when the user says "playing light music", the device (such as a mobile phone) that receives the voice command at this time is a response device, which is a device that executes the voice command, and performs a light music playing operation.

However, once there are multiple smart devices, if the user inputs an instruction to control the smart device, but does not specify a specific device to execute the control, how to select a suitable execution device is a technical difficulty in the prior art when operating multiple devices through a non-directional instruction. For example, as shown in FIG. 1, taking a command input by a user being a voice command as an example, a plurality of devices such as a smart light, a smart speaker, a smart water heater, a smart phone, and a smart TV can perform a response operation according to a user's voice command, but when the voice command input by the user is "I want to know the latest news", the devices capable of executing the command are a smart speaker, a smart phone, and a smart TV, that is, multiple devices can execute the user's voice command, and meanwhile, which one is going to perform the above operation is a difficult point in the prior art.

DISCLOSURE OF INVENTION

Technical Problem

An aspect of the present disclosure to provide a device control method, a conflict processing method, corresponding apparatus and electronic device.

Solution to Problem

In order to overcome the above technical problems or at least partially solve the above technical problems, the following technical solutions are proposed:

In a first aspect, the application provides a device control method, comprising:
acquiring an input instruction of user;
acquiring at least one of the following information: user information, environmental information, device information;
determining at least one execution device of the input instruction based on the acquired information and the input instruction; and
controlling the at least one execution device to perform a corresponding operation.

In a second aspect, the present application provides a conflict processing method, comprising:
acquiring an input instruction of user;
performing conflict detection based on an execution device corresponding to the input instruction to obtain a conflict detection result; and
performing corresponding processing based on the conflict detection result.

In a third aspect, the present application provides a device control apparatus, comprising:
a first acquisition module configured to acquire an input instruction of user;
a second acquisition module configured to acquire at least one of the following information: user information, environment information, device information;
a determining module configured to determine at least one execution device of the input instruction based on the acquired information and the input instruction; and
a control module that controls the at least one execution device to perform a corresponding operation.

In a fourth aspect, the application provides a conflict processing apparatus, comprising:
an acquisition module configured to acquire an input instruction of user;
a conflict detection module configured to perform conflict detection according to an execution device corresponding to the input instruction, to obtain a conflict detection result; and
a processing module configured to perform corresponding processing based on the conflict detection result.

In a fifth aspect, the application provides an electronic device, comprising:
a processor and a memory, the memory storing at least one instruction, at least one program, a code set, or an instruction set, the at least one instruction, the at least one program, the code set, or the instruction set being loaded and executed by the processor to implement the method of the first aspect of the present application.

In a sixth aspect, the application provides an electronic device, comprising:
a processor and a memory, the memory storing at least one instruction, at least one program, a code set, or an instruction set, the at least one instruction, the at least one program, the code set, or the instruction set being loaded and executed by the processor to implement the method of the second aspect of the present application.

In a seventh aspect, the present application provides a computer readable storage medium for storing computer instructions, programs, code set, or instruction set, when the computer instructions, the programs, the code set, or the instruction set are executed on a computer, the computer is caused to perform the method of the first aspect of the application.

In an eighth aspect, the present application provides a computer readable storage medium for storing computer instructions, programs, code set, or instruction set, when the computer instructions, the programs, the code set, or the instruction set are executed on a computer, the computer is caused to perform the method of the second aspect of the application.

In a ninth aspect, the present application provides an electronic device comprising:
at least one processor;
at least one transceiver operably coupled to the at least one processor;
at least one memory operably coupled to the at least one processor;
wherein the at least on processor is configured to:
acquire an input instruction of user;
acquire at least one of a user information, environmental information, or device information;
determine at least one second device of the input instruction based on the acquired information and the input instruction; and
control the at least one second device to perform a corresponding operation.

In a tenth aspect, the present application provides an electronic device, wherein the electronic device comprises the at least one processor is configured to:
acquire an intention analysis result corresponding to the input instruction;
perform fusion processing based on the intention analysis result and the acquired information to obtain a corresponding multi-modal fusion feature representation; and
determine the at least one second device of the input instruction based on the multi-modal fusion feature representation and the input instruction.

In an eleventh aspect, the present application provides an electronic device, wherein the electronic device comprises the at least one processor is configured to:
connect the intention analysis result and the acquired information to obtain a multi-modal feature representation; and
perform attention-weighting processing on the multi-modal feature representation through a feature fusion network, to obtain the corresponding multi-modal fusion feature representation.

In a twelfth aspect, the present application provides an electronic device; wherein the electronic device comprises the at least one processor is configured to:
determine word vectors corresponding to the intention analysis result and the acquired information; and
connect the word vectors to obtain the multi-modal feature representation.

In a thirteenth aspect, the present application provides an electronic device, wherein the feature fusion network comprises a plurality of fusion modules;
wherein at least one of plurality of fusion modules comprises a multi-head attention layer, a fusion normalization layer and a fully connected layer;
wherein the multi-head attention layer is configured to perform attention-weighting processing on input feature of a fusion module to which the multi-head attention layer belongs;
wherein the fusion normalization layer is configured to fuse the input feature of the fusion module to which the fusion normalization layer belongs and the attention-weighting processed feature of the multi-head attention layer, and normalize the fusion result; and
wherein the fully connected layer is configured to perform feature extraction on the normalized processing result, and output the extracted feature.

In a fourteenth aspect, the present application provides an electronic device, wherein the electronic device comprises the at least one processor is configured to:
acquire, by a device selection network, a first contribution of each modal feature corresponding to the acquired information and the input instruction for device selection, and a second contribution of respective word feature corresponding to the input instruction for device selection,
determine the at least one second device of the input instruction based on the respective modal feature, the respective word feature, the first contribution, and the second contribution.

In a fifteenth aspect, the present application provides an electronic device, wherein the electronic device comprises the at least one processor is configured to:
acquire the respective modal feature by the following way:
acquire the intention analysis result corresponding to the input instruction;
perform fusion processing on the intention analysis result and the acquired information to obtain a corresponding multi-modal fusion feature representation; and
take respective feature of the multi-modal fusion feature representation as the respective modal feature.

In a sixteenth aspect, the present application provides an electronic device, wherein the device selection network comprises a modal feature contribution determination network, a word feature contribution determination network, a classification network, and a device determination network;
wherein the modal feature contribution determination network is configured to perform attention-weighting on the respective modal feature to obtain respective modal feature including the first contribution;
wherein the word feature contribution determination network is configured to perform attention-weighting on the respective word feature based on the respective modal feature including the first contribution, to obtain respective word feature including the second contribution;
wherein the classification network is configured to obtain an output device based on the respective modal feature including the first contribution and the word feature including the second contribution; and
wherein the device determination network is configured to obtain the at least one second device of the input instruction based on the output device obtained by the classification network.

In a seventeenth aspect, the present application provides an electronic device, wherein the classification network is specifically configured to obtain the output device at least once based on the respective modal feature including the first contribution and the respective word feature including the second contribution; and
wherein the device determination network is specifically configured to obtain the at least one second device of the input instruction according to the output device each time obtained by the classification network.

In an eighteenth aspect, the present application provides an electronic device,
wherein when the number of the configured output devices each time obtained by the classified network is at least two, the obtaining the at least one second device of the input instruction according to the output device each time obtained by the classification network comprises:

if the number of times the output device obtained by the classification network is one, determine one second device according to probability corresponding to each output device obtained by the classification network; and if the number of times the output device obtained by the classification network is at least two, determine at least two second devices according to probability corresponding to paths between the respective output devices being obtained at least twice by the classification network.

In a nineteenth aspect, the present application provides an electronic device comprising:

at least one processor;

at least one transceiver operably coupled to the at least one processor;

at least one memory operably coupled to the at least one processor;

wherein the at least one processor configured to:

acquire an input instruction of user;

perform conflict detection based on second device corresponding to the input instruction, obtain a conflict detection result; and perform corresponding processing based on the conflict detection result.

In an twentieth aspect, the present application provides an electronic device, wherein the conflict detection comprises device conflict detection, and wherein the least one processor is configured to when controlling the second device to execute the input instruction, obtain Z by using a pre-trained classification model, potential conflicting device of the second device, and perform the conflict detection according to device state of the second device and the device state of the potential conflicting device;

when controlling the second device to execute the input instruction, obtain, by using a pre-trained correlation model, a related device that satisfies a predetermined correlation coefficient with the second device, and perform the conflict detection according to the device state of the related device and the device state of the second device.

In a twenty first aspect, the present application provides an electronic device, wherein the electronic device comprises the at least one processor is configured to:

control the conflicting device to perform a corresponding operation, when the conflicting device is detected.

In a twenty second aspect, the present application provides an electronic device, wherein, the conflict detection comprises a scene conflict detection, and before controlling the second device to execute the input instruction, wherein the at least one processor is configured to:

acquire current scene information; and perform conflict detection based on the second device, the input instruction, and the current scene information.

The device control method, the conflict processing method, the corresponding apparatus, and the electronic device provided by the present application can determine at least one optimal execution device by using at least one of the obtained input instruction as well as the user information, the environment information, and the device information when the user does not specify the specific execution device, thereby better responding to the user.

Advantageous Effects of Invention

Various embodiments of the present disclosure provide a non-specified device response to voice commands.

BRIEF DESCRIPTION OF DRAWINGS

In order to more clearly illustrate the technical solutions in the embodiments of the present application, a brief description of the drawings used in the description of the embodiments of the present application will be briefly described below.

BEST MODE FOR CARRYING OUT THE INVENTION

Figure 1:
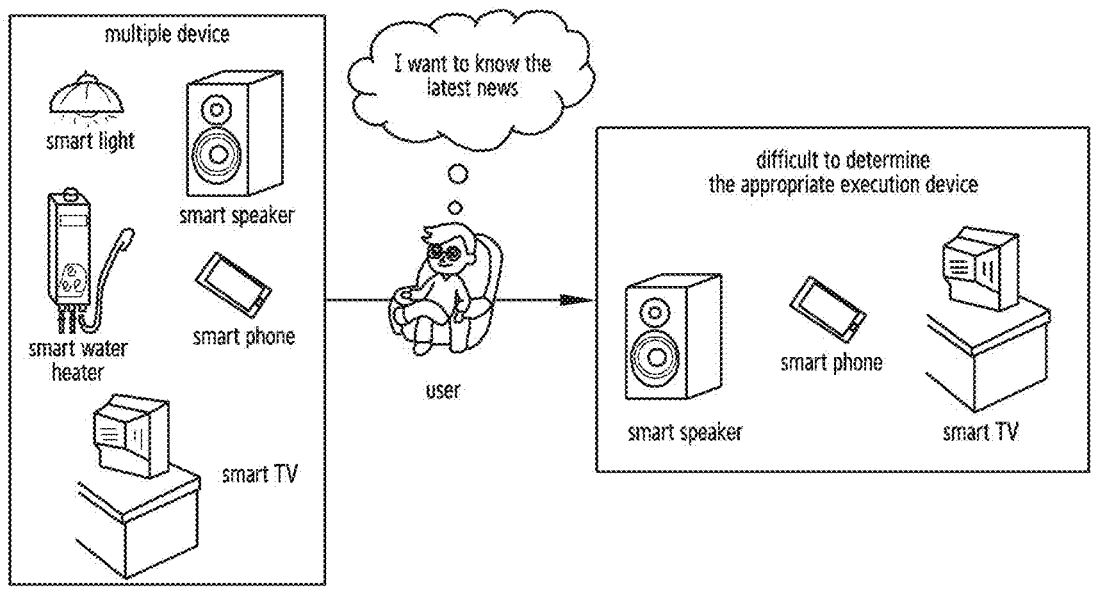
FIG. 1 is a schematic diagram that the execution device is difficult to determine in prior art according to an embodiment of the present application.

The embodiments of the present application are described in detail below, and the examples of the embodiments are illustrated in the drawings, wherein the same or similar reference numerals are used to refer to the same or similar elements or elements having the same or similar functions. The embodiments described below with reference to the accompanying drawings are intended to be illustrative only, and are not to be construed as limiting.

It can be understood by those skilled in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when an element is referred to as being "connected to" or "coupled to" another element, it may be directly connected or coupled to other elements, or intervening element is provided with therebetween. In addition, "connected to" or "coupled to" as used herein may include wireless connection or coupling. As used herein, term "and/or" includes all or any of one or more associated listed items or combinations thereof.

In order to make the objects, technical solutions and advantages of the present application more clear, the embodiments of the present application will be further described in detail below with reference to the accompanying drawings.

Figure 2A:
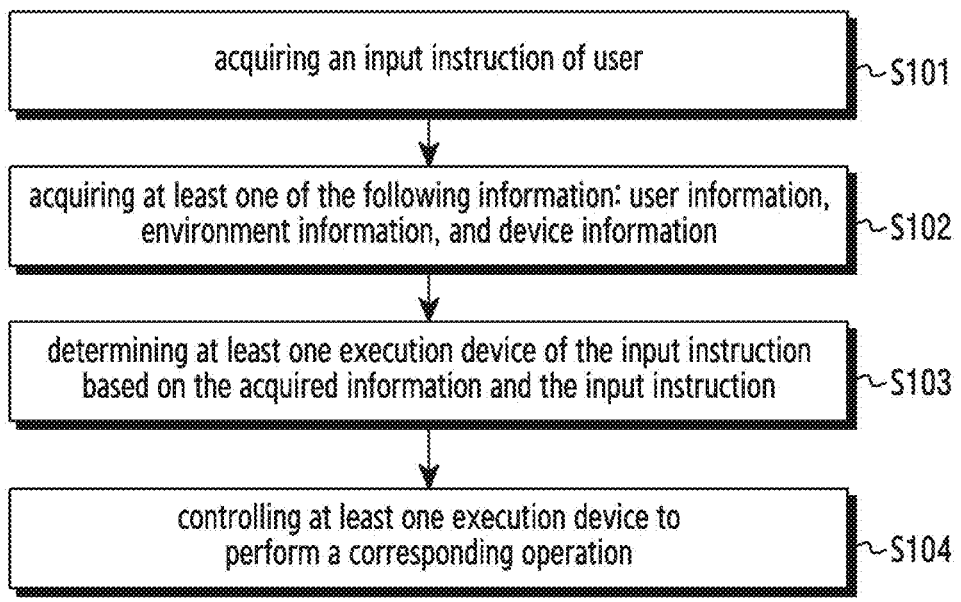
FIG. 2A is a schematic flowchart of a device control method according to an embodiment of the present application.

An embodiment of the present application provides a device control method, as shown in FIG. 2A, the method includes:

Step S101: acquiring an input instruction of user;

Step S102: acquiring at least one of the following information: user information, environment information, and device information;

Step S103: determining at least one execution device of the input instruction based on the acquired information and the input instruction; and Step S104: controlling at least one execution device to perform a corresponding operation.

In step S101 of the embodiment of the present application, the input instruction of the user may include, but is not limited to, a voice instruction, a text instruction, an action instruction, and/or an expression instruction. In the embodiment of the present application, when the input instruction of the user does not specify a specific execution device, the corresponding smart device may be controlled, and when a specific device name is specified by the input instruction of the user, but the device name corresponds to multiple execution devices, the appropriate smart device may be controlled.

In step S102 of the embodiment of the present application, the device information includes but is not limited to at least one of the following:

(1) Device status, indicating whether the device is in use and available. For example, for a television, the device status may be in the play, standby, off, unable to connect, and the like; for an electric light, the device status may be on, off, unable to connect, and the like; for an air conditioner, the status may be on, off, unable to connect, and the like.

In a feasible implementation manner, the real-time status of the device can be recorded by maintaining a device status table. When the device status changes, the status of the corresponding device in the device status table changes. In actual operation, the status of the device may be scanned at intervals and recorded in the device status table; or when the status of the device changes, the device status table is updated by accepting the active feedback of the device.

(2) The device profile, indicating the inherent characteristics of the device, such as the frequency of playing record, parallelism or the like, for example, the playback history and the corresponding frequency can be recorded for a television having a play function.

(3) Device location information, for example, may be determined by information such as current global positioning system (GPS) information of the device or location information acquired by other means. In other embodiments, the device location information of some devices may also be one of the device profile, such as a device with a fixed device location, such as a smart air conditioner.

(4) The device belonging scene, in the embodiment of the present application, the scene may be predefined, and each scene may correspond to a plurality of target environment states and/or target device states, for example, in a "sleeping" scene, the corresponding temperature may be 20~23 degrees, humidity is 75~80%, decibel (dB) is 0~40 dB, and illuminance (LUX) is 0 LUX.

In other embodiments, the device scene may also be one of the device states, or may be recorded in the device state table.

(5) The device user, that is, the current actual user of the device.

In other embodiments, the device user may also be one of the device states, or may be recorded in the device state table.

(6) The signal strength of the device, that is, the strength of the network signal to which the device is connected.

(7) Device behavior pattern, that is, the common linkage behavior between multiple devices when the user operates multiple devices at the same time. For example, when the user uses the mobile phone to make a call, the sound of the television broadcast will be lowered.

In step S102 of the embodiment of the present application, the user information includes, but is not limited to, at least one of the following:

(1) User sentiment data, that is, the user's current emotional feelings, such as joy, anger, worry, sadness, fear, surprise, and the like. In practical applications, sentiment data can also be characterized by physiological signals, such as ECG, EEG, CGR, heart rate, respiratory rate, blood pressure, body temperature, and the like.

(2) User profile, that is, the user's inherent characteristics, such as the user's voiceprint characteristics, age, gender, preferences (such as what period of time to use what equipment to do things).

(3) User location information, for example, may be determined by a camera, an infrared sensor, or other user positioning device or system.

In step S102 of the embodiment of the present application, the environment information includes, but is not limited to, at least one of the following:

(1) Sound intensity, including but not limited to the sound intensity of the device user's sound, the sound intensity of other user's sounds, the sound intensity of each device, and the sound intensity of other source sounds detected by the device.

In the embodiment of the present application, the device may further determine the distance from the target object according to the detected sound intensity of the target object (eg, device user, other user, etc.).

(2) Light intensity, including the light intensity of natural light (such as sunlight) and/or the light intensity of artificial light (such as lamplight, display screen light, etc.).

(3) Weather, including but not limited to meteorology, temperature, humidity, air pressure, wind direction, climate, etc. In the embodiment of the present application, temperature, humidity, and the like of indoors and outdoors can also be separately recorded.

In the step S102 of the embodiment of the present application, the acquired information may be the acquired at least one of the device status, the device profile, the device location information, the device belonging scene, the device user, the device signal strength, the device behavior pattern, the user sentiment data, the user profile, and the user location information, sound intensity, light intensity, weather, and the like.

Figure 2B:
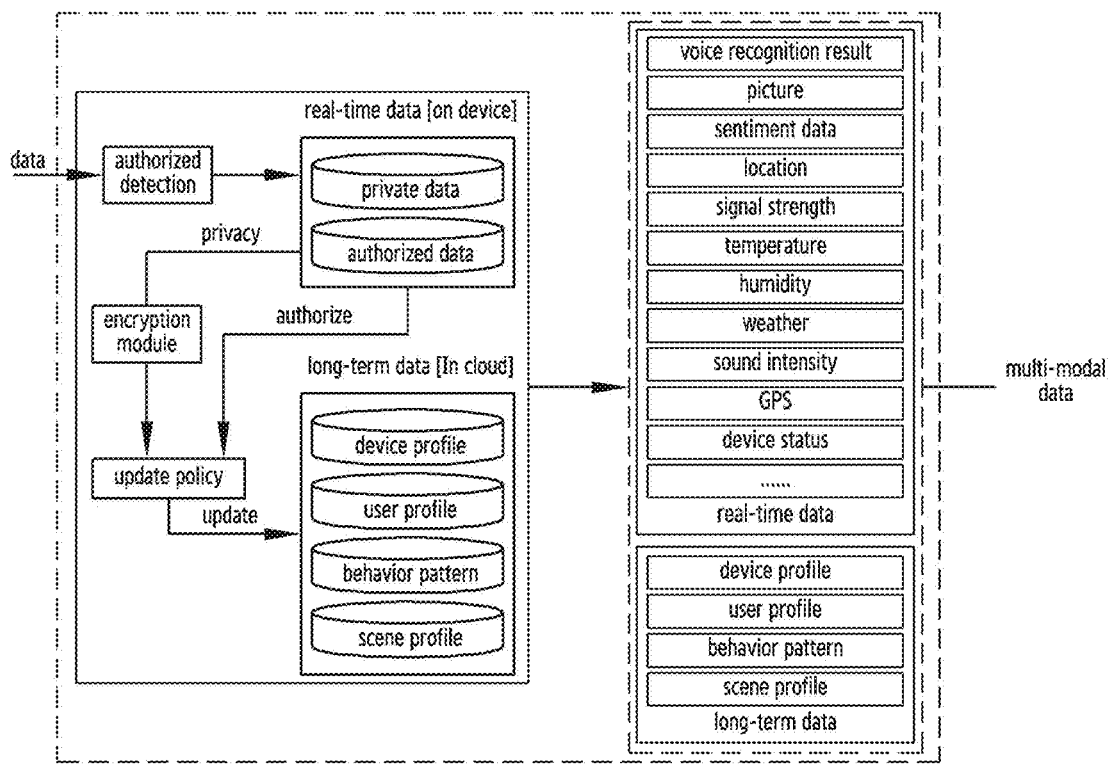
FIG. 2B is a schematic diagram of multi-modal data collection according to an embodiment of the present application.

In the embodiment of the present application, the acquired information may be divided into real-time data and long-term data, as shown in FIG. 2B. The long-term data includes device profile, user profile, behavior patterns, scene profile, and the like extracted by the history log and corresponding algorithms. Real-time data includes instruction recognition results (can be voice recognition results if the command is a voice command), pictures, sentiment data (sentiment recognition results), environmental parameters (such as position, signal strength, temperature, humidity, weather, sound intensity, GPS signal, etc.), device status, and the like. Wherein, real-time data can be used to update long-term data to ensure the long-term data more and more accurate. Further, privacy protection is provided during the update process, such as encrypting private data with asymmetric encryption. The acquired information can also be referred to as multi-modal data.

With reference to FIG. 2B, when real-time data is input, it is first authorized to be detected whether the data is privacy or authorization data. If it is authorization data, it updates the long-term data directly according to the authorization and update policy. If it is private data, it needs to be encrypted by the encryption module, and then the long-term data is updated according to the update policy, thereby ensuring the security of the user's private information. Moreover, after the completion of the command execution, the real-time data is saved in the form of a log, and the device profile, the user profile, and the behavior pattern in the long-term data are updated through corresponding parts in the history log. The specific update frequency is adjusted according to actual needs, which is daily, weekly, and even monthly updates.

In the embodiment of the present application, the long-term data can be stored in the cloud, and the real-time data can be stored in the local terminal.

In the embodiment of the present application, the multiple device selection method is based on the consideration of user privacy. If the conventional voice recognition does not specify a specific performer, or if a specific voice command is preset, but there are multiple corresponding devices, the final performer cannot be recognized. The method of the present application not only considers real-time data, but also comprehensively considers long-term data such as user profile and device profile, which can accurately select an execution device.

In the step S103 of the embodiment of the present application, when the device is not specified by the user in the prior art, the device associated with the sentence needs to be defined in advance, and the embodiment of the present application can automatically select the optimal execution device. Since the user does not specify a specific device, it is necessary to determine the potential optimal execution device to respond to the user command. After detecting the input instruction of the user, the embodiment of the present application combines the input instruction and the obtained information to comprehensively determine and select at least one optimal execution device corresponding to the input instruction, and then generates control command of each determined execution device. In step S104, each determined execution devices is controlled to perform a corresponding operation, thereby better responding to the user.

In the embodiment of the present application, a feasible implementation manner is provided for step S103, specifically, including the following steps:

Step S1031: acquiring an intention analysis result corresponding to the input instruction;

Step S1032: performing fusion processing on the intention analysis result and the acquired information to obtain a corresponding multi-modal fusion feature representation; and Step S1033: determining at least one execution device of the input instruction based on the multi-modal fusion feature representation and the input instruction.

In step S1031 of the embodiment of the present application, the intention analysis result corresponding to the input instruction may represent the user intention. The user's input instructions can be recognized, analyzed, etc., and the corresponding intention analysis results are obtained.

As an example, taking the input command being a voice command as an example, step S1031 can be implemented in the following manner:

Perform voice recognition on the voice command input by the user, and convert the voice into corresponding text. In some specific embodiments, it may further include performing speaker recognition on the voice command input by the user, and the speaker recognition is mainly to determine the identity of the speaker.

Follow the steps below to understand the recognized text:

Step 1: extract intention analysis results in the text, including but not limited to shallow syntax features, word vectors, etc.

Step 2: perform classification of the intention domain to obtain the classification result of the intention domain;

Step 3: perform detailed intention classification based on the classification result of the intention domain to obtain the intention analysis result.

It should be understood by those skilled in the art that the above mentioned intentional classification of voice commands is only an example, and can be suitable changed based on the above examples to be applicable to other types of input instructions, and also belongs to the spirit and scope of the present application.

In step S1032 of the embodiment of the present application, the intention analysis result obtained in step S1031 and the information obtained in step S102 are merged to obtain a corresponding multi-modal fusion feature representation, and the multi-modal fusion feature representation can cover information of the various modalities that affect device selection. Then, in step S1033, the multi-modal fusion feature representation and the input command are combined to determine the execution device, that is, the information of various modalities is comprehensively considered to select the optimal execution device.

Considering that the information of different modalities has different importance in device selection, the embodiment of the present application proposes a multi-modal attention mechanism to fuse different modal information as a multi-modal fusion feature representation of step S1032.

Specifically, the intention analysis result and the acquired information (i.e., information of different modalities) may be firstly combined to obtain a multi-modal feature representation, and the features of different modalities are merged through a multi-modal attention mechanism.

Figure 3:
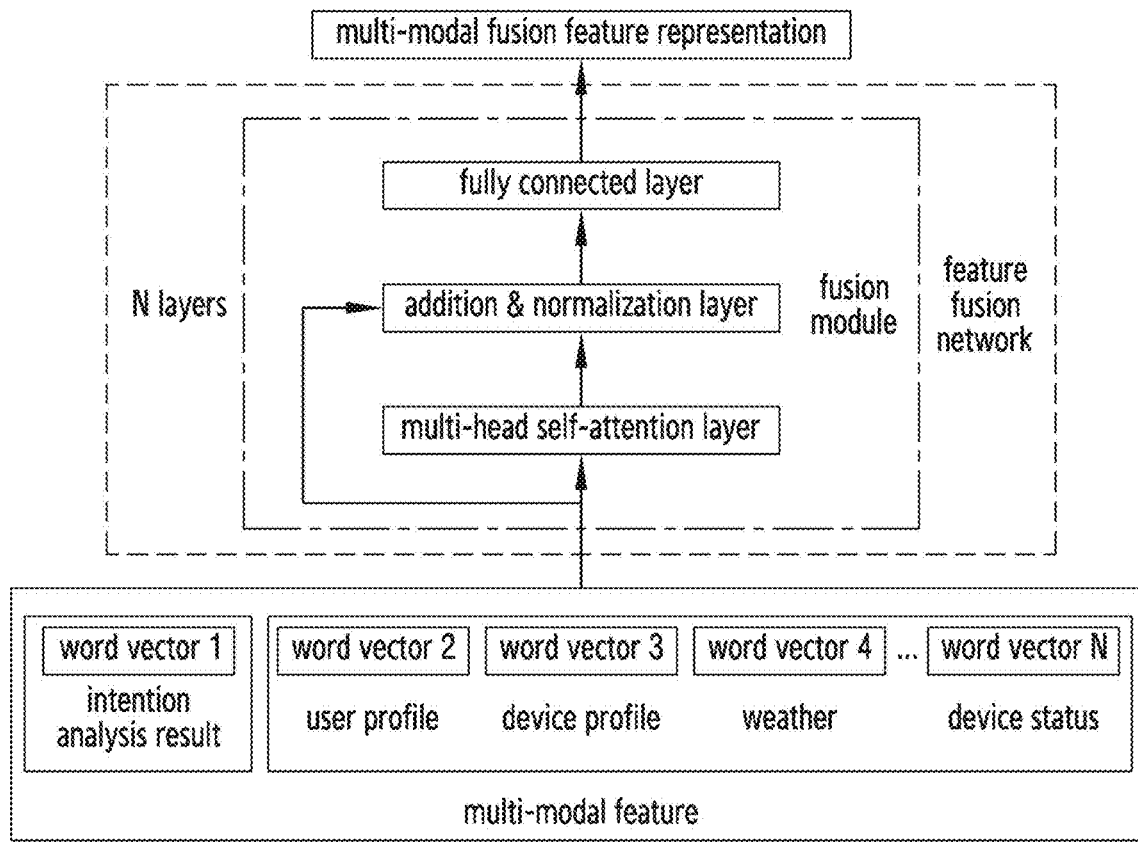
FIG. 3 is a schematic diagram of a feature fusion network according to an embodiment of the present application.

As shown in FIG. 3, the multi-modal attention mechanism can be implemented by using a feature fusion network, that is, the feature fusion network performs attention-weighting processing on the multi-modal feature representation by using a feature fusion network to obtain the corresponding multi-modal fusion feature representation.

The feature fusion network includes several fusion modules (corresponding to N layers self-attention network in FIG. 3, N≥1), and each fusion module includes a multi-head attention layer (corresponding to the multi-head self-attention layer in FIG. 3), a fusion normalized layer (corresponding to the addition & normalization layer in FIG. 3) and the fully connected layer.

The multi-head attention layer is used to perform attention-weighting processing on the input features of the fusion module, that is, to increase the weight of the features of different modes, and can also be understood as extracting more important features in features of different modes. Wherein, the input of each multi-head attention layer is the input feature of the fusion module to which it belongs, and since the feature fusion network may include several fusion modules, for the first fusion module, the input feature is the input of the feature fusion network, that is, the characteristics of different modalities; for the second fusion module and the subsequent fusion module, the input feature is the output of the previous fusion module, and taking the second fusion module as an example, the input feature of the second fusion module is the output of the first fusion module, and so on.

The fusion normalization layer is used for fusing the input features of the fusion module to which the fusion normalization layer belongs and the feature of multi-head attention layer after the attention-weighting processing (also referred to as residual connection processing), and normalizing the fusion result. The role of this layer is to preserve the vector information of the input features of the fusion module to which the layer belongs and to ensure the stability of the training. For the input feature of the fusion module to which the normalization layer belongs, reference may be made to the description of the input feature of the fusion module to which the multi-head attention layer belongs, and details are not described herein.

The fully connected layer is used to extract the feature from the normalized processing result and output the extracted feature, and it can also be understood that the function of the layer is further feature extraction to reduce the feature dimension and reduce the feature size. The output of each fully connected layer is the output of the fusion module to which it belongs. When the feature fusion network includes a fusion module, the extracted feature output by the fully connected layer is a multi-modal fusion feature representation; when the feature fusion network includes at least two fusion modules, the extracted features output by the fully connected layer in the last fusion module are multi-modal fusion feature representation, and the output of the fully connected layer in each fusion module before the last fusion module is respectively corresponding to the output of the next fusion module. Taking the first fusion module as an example, the output of the fully connected layer in the first fusion module is the input of the second fusion module, and so on.

In the embodiment of the present application, a feasible implementation is provided for the above-mentioned connecting information of different modalities to obtain a multi-modal feature representation. Specifically, it is first determined word vectors respectively corresponding to the intention analysis result and the acquired information.

The result of the intention classification obtained in step S1031 may be directly a word vector, and the word vector corresponding to the intention analysis result is the intention analysis result itself; or the intention analysis result obtained in step S1031 may be other types of information. The feature is extracted from the intention analysis result and mapped to the corresponding word vector.

Determining the word vectors corresponding to the information acquired in step S102, that is, performing the feature extraction on the information acquired in step S102, and mapping it (also referred to as representation space, which will not be described hereinafter) as the corresponding word vector (also called a representation vector). Taking the device location information as an example, the current GPS information of the device or the location information obtained by other manners may be mapped into a one-hot (one-hot coding) vector; taking the device signal strength as an example, the signal strength of each device may be mapped to a vector reflecting the strength and weakness of the signal. Besides, other information of the information acquired in step S102 may be mapped to a word vector by means of a joint representation or a coordinated representation. Joint representation applies to neural networks, graph models or sequence models; coordinated representation applies to data with similarity or structure. In the embodiment of the present application, since the data is unstructured data, such as emotion data, profile data, etc., a Joint representation can be selected.

Further, each word vector is connected to obtain a multi-modal feature representation (i.e., a joint vector of features of different modalities), that is, the intention analysis result is combined with the word vectors corresponding to the information acquired in step S102 to obtain a multi-modal feature representation. In an actual application, as shown in FIG. 3, the process may also be implemented by using a fusion network, that is, the word vector of the intention analysis result and the word vectors corresponding to the information acquired in step S102 are input into the fusion network, and the multi-modal feature representation is output. For example, in FIG. 3, the word vector of the intention analysis result, the word vector of the user profile, the word vector of the device profile, the word vector of the weather, the word vector of the device state, and the like are input into the fusion network to output the multi-modal feature representation, and are further input into the above feature fusion network to output the multi-modal fusion feature representation.

In the embodiment of the present application, a method for selecting a device or a device group based on the attention mechanism is further provided for step S103. Specifically, a first contribution of each modal feature corresponding to the input instruction and the acquired information to the device selection and a second contribution of the word feature corresponding to the input instruction to the device selection are acquired through device selection network. At least one execution device of the input instruction is determined based on each modal feature, each word feature, the first contribution, and the second contribution.

With the above process of obtaining the intention analysis result corresponding to the input instruction, and performing the fusion processing on the intention analysis result and the obtained information to obtain the corresponding multi-modal fusion feature representation, in the embodiment of the present application, each feature of the multi-modal fusion feature representation may be the modal feature, that is, the device selection network selects the device based on the multi-modal fusion feature representation, as in step S1033 of the embodiment of the present application, a first contribution of each modal feature in the multi-modal fusion feature representation to the device selection, and a second contribution of the word feature corresponding to the input instruction to the device selection are acquired through device selection network, and at least one execution device of the input instruction is determined based on each modal feature, each word feature, the first contribution, and the second contribution.

Figure 4:
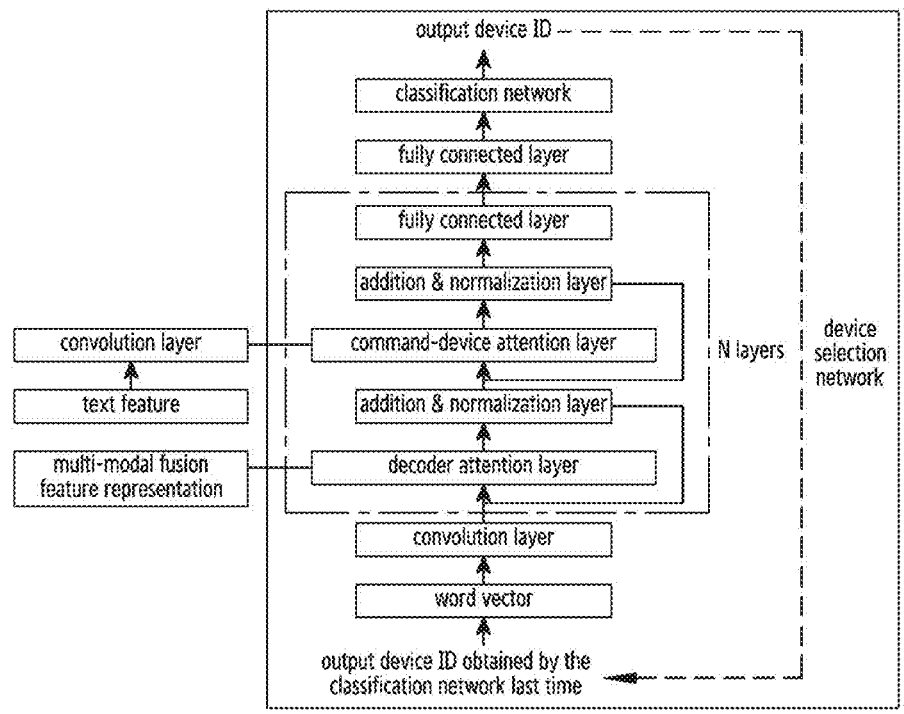
FIG. 4 is a schematic diagram of a device selection network according to an embodiment of the present application.

As shown in FIG. 4, the device selection network includes a modal feature contribution determination network (corresponding to the decoder attention layer in FIG. 4) and a word feature contribution determination network (corresponding to the command-device attention layer in FIG. 4), the classification network (corresponding to the classification network in FIG. 4, for the actual operation, the classification network may adopt the Softmax layer, etc.) and the device determination network (not shown in FIG. 4).

The modal feature contribution determination network is used for attention-weighting to each modal feature to obtain each modal feature including the first contribution. Referring to FIG. 4, the multi-modal fusion feature representation obtained in step S1032 is input to the decoder attention layer, each modal feature in the multi-modal fusion feature representation is weighted by the decoder attention layer, and the attention-weighted multi-modal fusion feature representation is output (i.e., based on the input multi-modal fusion feature representation, the contribution weights from different modal features are fused, the greater the weight of the modal features, the greater the contribution to the selected device).

The word feature contribution determination network is configured to weight attention on each word feature based on each modal feature including the first contribution, to obtain each word feature including the second contribution, wherein each word feature corresponding to the input instruction is obtained by extracting feature of the input instruction of the user, including the characteristics of each word extracted in the sentence corresponding to the semantics of the input instruction of the user. Taking the input command being a voice command as an example, it may be a feature extracted from the text after the voice is converted into the corresponding text. Referring to FIG. 4, the weighted multi-modal fusion feature representation and the convolved text feature (the text feature is obtained through a convolution layer, wherein when the input instruction is a voice command, the text feature can be a text feature) are input into the command-device attention layer, using the weighted multi-modal fusion feature representation, the convolved text features are performed attention-weighting, and the attention-weighted text features are output (ie, based on the input convolved text features, the contribution weights from different word features are fused, and the greater the weight of the word features, the greater the contribution to the selected device).

The classification network is used to obtain an output device based on each modal feature including the first contribution and each word feature including the second contribution; with reference to FIG. 4, the attention-weighted multi-modal fusion feature representation and attention-weighted text feature are input into classification network, before input into the classification network, the attention-weighted multi-modal fusion feature representation and the attention-weighted text feature may be connected in advance (for example, addition & normalization layer and fully connected layer pass through the command-device attention layer in FIG. 4)), then the obtained connection result is input into the classification network, and the output device of the classification network is output.

The device determination network is configured to obtain at least one execution device of the input instruction based on output device obtained by the classification network.

In the embodiment of the present application, the device selection network may include a loop execution process. Specifically, the classification network is configured to at least once obtain an output device based on each modal feature including the first contribution and each word feature including the second contribution;

The device determination network is configured to obtain at least one execution device of the input instruction according to the output device obtained by the classification network.

With reference to FIG. 4, when the multi-modal fusion feature representation obtained in step S1032 is input into the decoder attention layer for the first time, and the attention-weighted multi-modal fusion feature representation is output, and the weighted multi-modal fusion feature representation and the convolved text feature are output to the command-device attention layer, the attention-weighted text feature is output, the attention-weighted multi-modal fusion feature representation and the attention-weighted text feature are input into the classification network, and the first output device is output;

When the multi-modal fusion feature representation obtained in step S1032 is input into the decoder attention layer for the second time, the first output device (corresponding to the "output device ID obtained last time in the classification network" in FIG. 4) is input, based on the first output device, each modal feature in the multi-modal fusion feature representation is attention-weighted, the attention-weighted multi-modal fusion feature representation is output, the related feature of the first output device is connected with the weighted multi-modal fusion feature representation (for example, in FIG. 4, the addition & normalization layer pass through the decoder attention layer, the connected result and the convolved text feature are input into the command-device attention layer, and the weighted multi-modal fusion feature representation can be utilized to attention-weight the convolved text features, and the attention-weighted text features are output, and the attention-weighted multi-modal fusion feature representation and the attention-weighted text feature are input into the classification network to output the second output device.

The loop execution process of the device selection network has the same manner, until the output device of the classification network meets the stop loop condition.

In this embodiment of the present application, each loop of the device selection network may include several modal feature contribution determination networks and word feature contribution determination networks (the same number as the modal feature contribution determination network). Wherein, for the first modal feature contribution determination network, whose input includes a multi-modal fusion feature representation and may also include an output device of the last output of the classification network, the attention-weighted multi-modal fusion feature representation is output and input into the first word feature contribution determination network. The first word feature contribution determination network outputs the attention-weighted text feature, and then inputs it to the second modal feature contribution determination network, the text feature is processed by the second modal feature contribution determination network and the word feature contribution determination network, and so on, until the attention-weighted text feature output from the last word feature contribution determination network and the attention-weighted multi-modal fusion feature representation output from the last modal feature contribution determination network in the loop are processed by the classification network.

Subsequently, the device determination network obtains at least one execution device of the input instruction according to the output device obtained by the classification network.

In the embodiment of the present application, the output device obtained by the classification network obtains a probability distribution that all devices may be selected, and prioritizes the devices according to the probability. By setting an appropriate threshold, the K devices with the highest probability is output as output devices (i.e., containing K output devices).

Then, when the number of output devices which is obtained by the configured classification network is one, that is, when K=1, if the first output device output by the classification network satisfies the stop loop condition, the number of times which the output device is obtained through the classification network is one, and the device determination network determines the first output device as an execution device corresponding to the input instruction.

When the number of output devices which are obtained by the configured classification network is one, that is, when K=1, if the Nth (N≥2) output device output by the classification network satisfies the stop loop condition, the number of times which the output device is obtained through the classification network is N, and the device determination network determines the output devices from the first one to the Nth one which are obtained by the classification network determines N execution devices corresponding to the input instruction.

When the number of output devices which are obtained by the configured classification network is at least two, that is, when K≥2, if the first output device output by the classification network satisfies the stop loop condition, the number of times which the output device is obtained through the classification network is one, the device determination network determines the execution device according to the probability to which each output device (K output devices) obtained by the classification network respectively corresponds, for example, determines the device with the highest probability among the K output devices as an execution device of the input instruction.

When the number of output devices which are obtained by the configured classification network is at least two, that is, when K≥2, if the Nth (N≥2) output device output by the classification network satisfies the stop loop condition, that is, the number of times which the output device is obtained through the classification network is N, the device determination network determines K paths when N=s, according to the probability respectively corresponding to the paths (a total of KN paths, each path includes N devices, and the actual operation, it may only maintain the current maximum K paths, for example, when N=s−1 (s≥2), there are K paths saved. When N=s, each path generates K points, then there are at most K*K paths, in which case K maximum paths can be selected from these paths, thereby determining the K paths corresponding to N=s, and then continuing to run until the end of the run) between the various output devices (K output devices) obtained by the classification network. For example, N devices corresponding to the path with the highest probability among the KN paths are determined as the N execution devices of the input instruction. In actual operation, a beam search algorithm may be used to select a device group (N execution devices) in loop decoding.

It can be seen that the method for determining a device/device group provided by the embodiment of the present application can be compatible with the selection of multiple devices.

In the embodiment of the present application, the device that inputs the decoder attention layer and the output device of the classification network may be characterized by identifiers of the devices, such as device ID (identity), device name, and the like.

With reference to FIG. 4, the identifier of the output device of the last classification network is mapped into an identifier vector (such as a word vector), and feature extraction is performed through a convolution layer to obtain an identifier feature; the identifier feature and the multi-modal fusion feature representation are input into the decoder attention layer, each modal feature in the multi-modal fusion feature representation is attention-weighted based on the identifier feature, and the attention-weighted multi-modal fusion feature representation is output; the identifier feature and the weighted multi-modal fusion feature representation is performed adding and normalizing (by addition and normalization layer, corresponding to the addition & normalization layer in FIG. 4, fusing the identifier feature and the weighted multi-modal fusion feature representation, also known as the residual connection processing, and normalizing the fusion result), the result of the addition and normalization and the convolved text feature are input into command-device attention layer (that is, the convolved text features is weighted by using the weighted multi-modal fusion feature representation) to output the attention-weighted text features; the attention-weighted multi-modal fusion feature representation and the attention-weighted text features are performed addition and normalization (by addition and normalization layer, corresponding to the addition & normalization layer in FIG. 4, for fusing the attention-weighted multi-modal fusion feature representation and the attention-weighted text feature, also known as residual connection processing, and normalizing the fusion result), and the obtained results of addition and normalization are fully connected (through the fully connected layer), in which the process of the attention weight of the decoder attention layer for the full connection may be P(P≥1) times (wherein the value of P corresponds to the value of N in FIG. 4, that is, P times processing are performed by the N layer in FIG. 4. For example, when N=2, where the device selection network includes two layers including the dotted line in FIG. 4, the process of the attention weight of the decoder attention layer for the full connection is performed twice); then the result of the full connection of the Pth output is input the fully connected layer again, in which obtains the full connection result and then it is input into classification network, and the output device of the current classification network is output.

In the embodiment of the present application, the Mth output device output by the classification network meets the stop loop condition which includes the M+1 output device output by the classification network as a preset termination identifier <\s>. That is, it may define the set {<s>, <\s>, <device 1>, <device 2>, <device 3> . . . } of identifiers for the target device that can be selected, where <s> indicates the initial identifier, <\s> indicates the termination identifier, and <device*> indicates the identifier of each device.

When the multi-modal fusion feature representation and the text feature are input for the first time, the device selection network automatically starts using the start identifier <s> to run, the classification network outputs the identifier <device 1> of the device 1; when the multi-modal fusion feature representation and the text feature are input for the second time, the device selection network automatically starts using the identifier <device 1> to run, and the classification network outputs the identifier <device 2> of the device 2; the above process is repeated until when the multi-modal fusion feature representation and the text feature are input for the L+1 (L≥1) times, the device selection network automatically starts using the identifier <device L> to run, the classification network outputs the termination identifier <\s>, and the device selection network stops the loop process.

When K=1, L=1, the classification network obtains the identifier sequence of the output device as "<s><device 1><\s>", and the device selection network determines the device 1 as the execution device.

When K=1, L≥2, the classification network obtains the identifier sequence of the output device as "<s><device 1> . . . <device L><\s>", and the device selection network determines device 1 to device L as execution device group.

When K≥2, L=1, the classification network obtains the identifier sequence of the output device as "<s><device 1><\s>" . . . "<s><device K><\s>", the device from 1 to K with the highest probability is determined to be the execution device.

When K≥2, L≥2, the classification network obtains the identifier sequence of the output device as "<s><device 1> . . . <device L><\s>" . . . "<s><device K> . . . <device L><\s>", there is a total of KL identifier sequences, each of which includes an identifier of L devices in addition to <s> and <\s>. As a path, there is a total of KL paths, the L devices corresponding to the path with the highest probability in the KL path is determined as the execution device group. In the actual operation, the current maximum K paths can be maintained only when the classification network obtains the output device. For details, it may be referred to the description above, herein it will not be repeated.

That is, in the embodiment of the present application, how many times the device selection network runs in loop, and the number of determined devices is one less than the number of the loop times.

In this way, a suitable execution device or execution device group can be selected for the user's input command.

Figure 5:
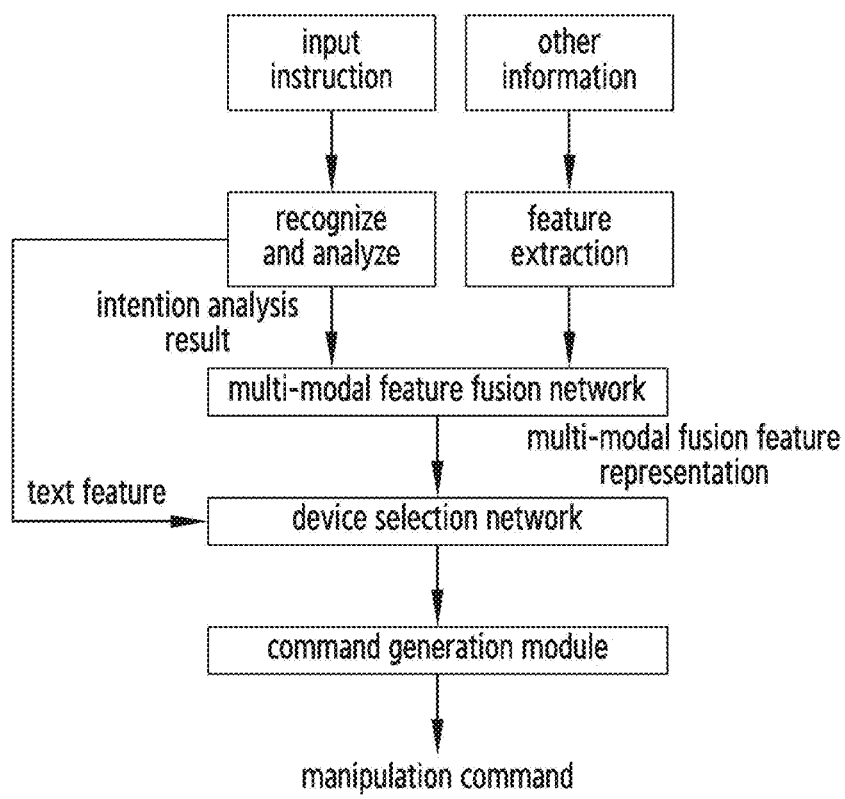
FIG. 5 is a schematic diagram of device selection according to an embodiment of the present application.

In the embodiment of the present application, as shown in FIG. 5, in combination with the above feature fusion network and device selection network, a complete execution flow of device selection is proposed.

Specifically, the input instruction is performed to recognition and analysis to obtain an intention analysis result, the input it into feature fusion network (corresponding to the multi-modal feature fusion network in FIG. 5). At the same time, after extracting features from at least one of the user information, the environment information, and the device information (corresponding to other information in FIG. 5), the extracted results are input into the feature fusion network. The feature fusion network outputs multi-modal fusion feature representation and then inputs it into the device selection network. At the same time, the text feature which is obtained by recognizing and analyzing the input instruction is input into the device selection network. The device selection network outputs the selected devices or device groups, the operation instruction of these devices or device groups are generated by command generation module.

In the embodiment of the present application, the feature fusion network and the device selection network may perform training separately or jointly.

If joint training is conducted, the training process is as follows:

a) Collecting data: the data involved in training includes real-time data and long-term data. The real-time data includes user input instructions, user sentiment data, device status, sound intensity, user location information, and the like; long-term data includes user profile, device profile, and the like.

b) Processing data: intention classification of the user's input instructions in a), and vectorization of the results, while other real-time data and long-term data are vectorized.

c) Input data to the module: the vectorized multi-modal data in b) is input to the feature fusion network, and the multi-modal fusion feature representation output by the feature fusion network is input to the corresponding part of the device selection network, and the text feature of the user input instruction is input, and the device selection network may output the correct execution device. If the output has a deviation, the network parameters are continuously adjusted during the training until the network is stable, and the correct execution device can be output.

The implementation of the embodiments of the present application will be exemplified in the following with a few examples.

Figure 6A:
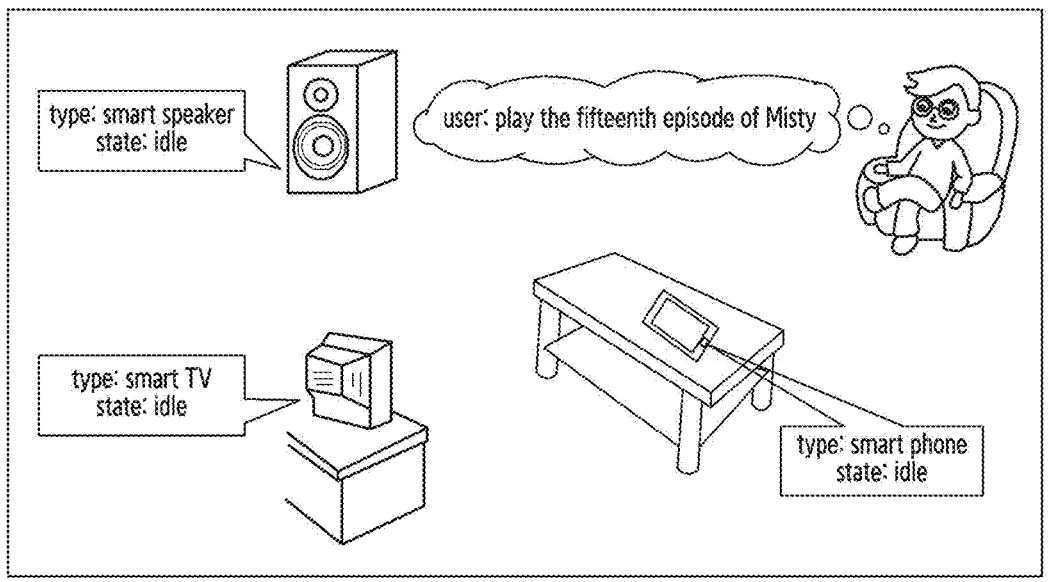
FIG. 6A is a schematic diagram of the example 1 according to an embodiment of the present application.

Example 1: When there are Multiple Devices that can Execute User Voice Commands, how to Determine the Optimal Performer by the Voice Command Input by the User For example, as shown in FIG. 6A, when the user issues a voice command "Playing the fifteenth episode of Misty" in the living room, there are speakers, a TV, and a mobile phone in the living room, and all of them are in an idle state, and it is necessary to confirm the best play device to response to the user, the specific process can be divided into the following steps:

Step 1.1: Obtaining the voice command of the user; and obtaining other information, such as device status, location, and the like.

Step 1.2: Performing voice analysis on the voice command, and then extracting the intention analysis results in the text to obtain the analysis results as shown in Table 1.

TABLE 1

| Intention analysis result | Value |
| --- | --- |
| Shallow syntax | Play/Verb; fifteenth/quantifier; Misty/Named entity; |
| Domain analysis | South Korea; drama |

The intention analysis result is obtained based on the above analysis results. Moreover, the text "Play the fifteenth episode of Misty" is obtained by voice recognition.

Figure 6B:
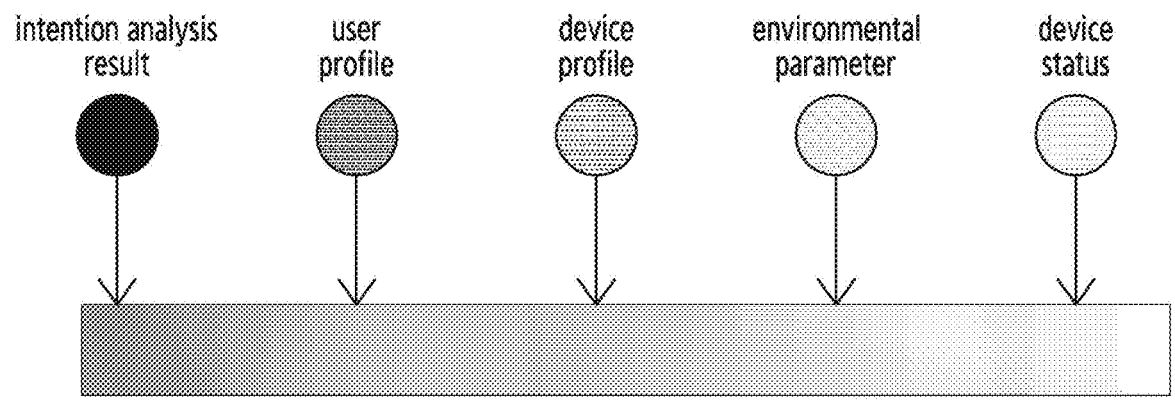
FIG. 6B is a schematic diagram of a joint vector representation according to an embodiment of the present application.

Step 1.3: The following features are obtained by feature extraction of other information: {Mobile_Idle, TV_Idle_with play history, speaker_idle, temperature_24, humidity_35%, . . . }. A joint vector representation (i.e., a multi-modal feature representation) of the multi-modal data is obtained by connecting the intention analysis results. As shown in FIG. 6B, the uppermost row in the figure is the multi-modal data to be input, the middle one is a vector representation of each data, and the lowermost one is a joint vector representation.

Step 1.4: Through the feature fusion network of FIG. 3, the joint vector representation will obtain a further fusion representation to obtain a multi-modal fusion feature representation.

Step 1.5: Through the device selection network of FIG. 4, the probability score of the obtaining device is as shown in Table 2.

TABLE 2

| Candidate device/device group | Score |
| --- | --- |
| TV | 0.8 |
| Speaker | 0.5 |

Step 1.6: Generating an execution command

As an example, the execution command obtained by the selected execution device and the results of semantic analysis is as follows:

Device: TV_living room

Execution command: {drama: The fifteenth episode of Misty}

In this example, when there are multiple devices that can execute the user voice command, the multi-modal feature representation is formed by the joint intention analysis result and the word vectors corresponding to other data, and then is input into the feature fusion network to form the multi-modal fusion feature representation, and finally the multi-modal fusion feature representation obtains an optimal execution device through the device selection network, thereby better responding to the user.

Figure 7A:
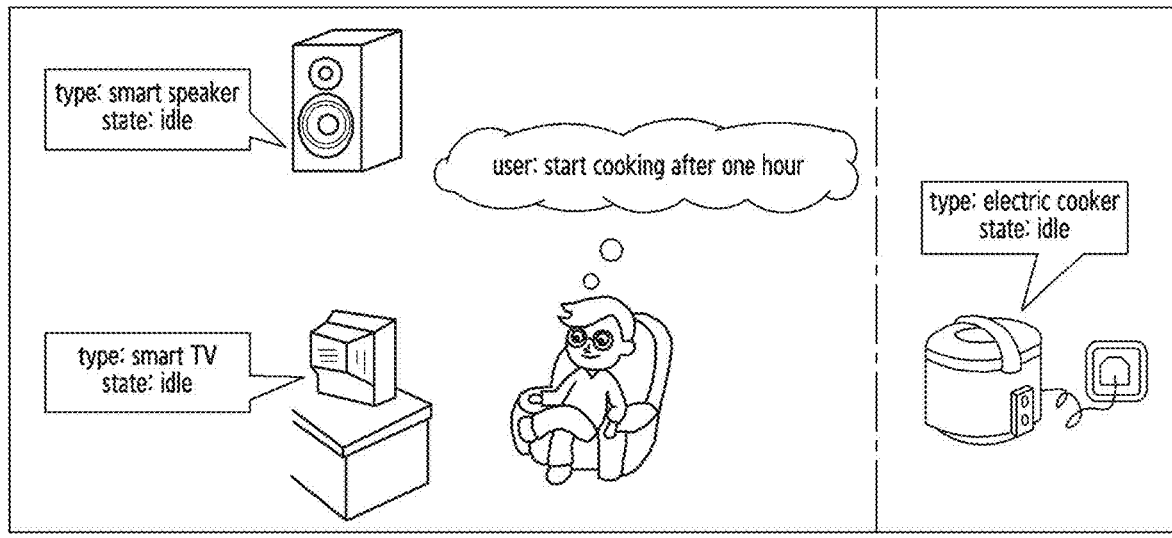
FIG. 7A is a schematic diagram of the example 2 according to an embodiment of the present application.

Example 2: How to Meet Complex and Varied User Intention when the Device that the User Wants to Control is Weak and not Enough to Respond to the User's Command For example, as shown in FIG. 7A, the user gives a voice command "Starting to cook after one hour" in the living room, and the electric rice cooker having the rice cooking function lacks the time function, and cannot accurately execute the user's voice command. And the electric rice cooker is in the kitchen, because the user is far away from the user, the user cannot view the execution status in real time (for example, start cooking or complete cooking, etc.).

At this time, it is possible to jointly meet the user's needs by combining a device having a timing function and a reminder function closer to the user, for example, through the TV with timing function and a sound with a speaker function in the living room. The specific process can be divided into the following steps:

Step 2.1: Obtaining the voice command of the user; and obtaining other information, such as device status, location, and the like.

Step 2.2: Performing voice analysis on the voice command, and then extracting the intention analysis result in the text to obtain the analysis results as shown in Table 3.

TABLE 3

| Intention analysis result | Value |
| --- | --- |
| Shallow syntax | start cooking/verb; after/adv; one hour/time quantifier |

The intention analysis result is obtained based on the above analysis results. Moreover, the text "start cooking after one hour" is obtained by voice recognition.

Step 2.3: The following features are obtained by feature extraction of other information: {Electric rice cooker_Idle, TV_Run, Speaker_Idle, Temperature_24, Humidity_35%, . . . }. A joint vector representation (i.e., a multi-modal feature representation) of the multi-modal data is obtained by connecting the intention analysis results.

Step 2.4: Through the feature fusion network of FIG. 3, the joint vector representation will obtain a further fusion representation to obtain a multi-modal fusion feature representation.

Figure 7B:
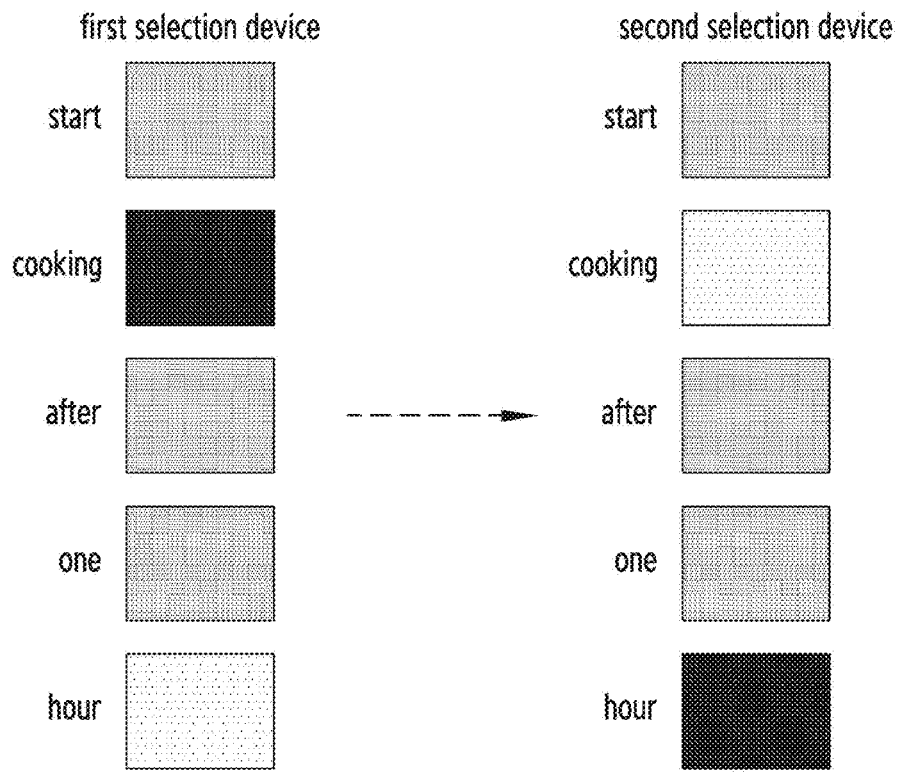
FIG. 7B is a schematic diagram of text feature weights according to an embodiment of the present application.

Step 2.5: According to the command-device attention layer of the device selection network in FIG. 4, the first selection device and the second selection device may each correspond to different weights of the text features (the darker the color, the higher the weight), as shown in FIG. 7B.

Through the device selection network, the probability scores of the obtaining path (device group) are shown in Table 4.

TABLE 4

| Candidate device/device group | Score |
| --- | --- |
| {TV, Electric rice cooker} | 0.65 |
| {Speaker, Electric rice cooker} | 0.55 |
| Electric rice cooker | 0.2 |

In FIG. 7B, when the first selection device is a television and the second selection device is a electric rice cooker, the attention weight of the text features corresponding to the {TV, electric rice cooker} device group shows that the television is more inclined to correspond to the monitoring command, and the electric rice cooker is more inclined to correspond to the cooking command.

Step 2.6: Generating an execution command.

As an example, the execution command is obtained by the selected execution device and the results of semantic analysis, as shown in FIG.

TABLE 5

| Step | Device | Function | Value |
| --- | --- | --- | --- |
| 1 | TV | Timing | 60 min |
| 2 | Electric rice cooker | Cooking | Steam |

TABLE 6

| Scene profile | Temperature (° C.) | Humidity (RH %) | Decibel (dB) | Illuminance (LUX) |
| --- | --- | --- | --- | --- |
| Sleeping | 20~23 | 75~80 | 0~40 | 0 |
| Cleaning | 10~40 | 50~60 | 70~100 | No requirement |
| Conference | 15~25 | 70~80 | 35~70 | 50~80 |

In this example, when the multi-device sequential response is involved, the multi-modal feature representation is formed by the joint intention analysis result and the word vectors corresponding to other data, and is input into the feature fusion network to form the multi-modal fusion feature representation, and finally the multi-modal fusion feature representation obtains the optimal execution device group through device selection network. At this time, the voice command of the user is decomposed into a plurality of associated commands, and the device group forms an execution command corresponding to each device according to the decomposed command, and executes the command. It can be seen from the example that the embodiment of the present application can solve the complicated and varied user intent, and only needs command decomposition without any setting in advance.

Figure 8:
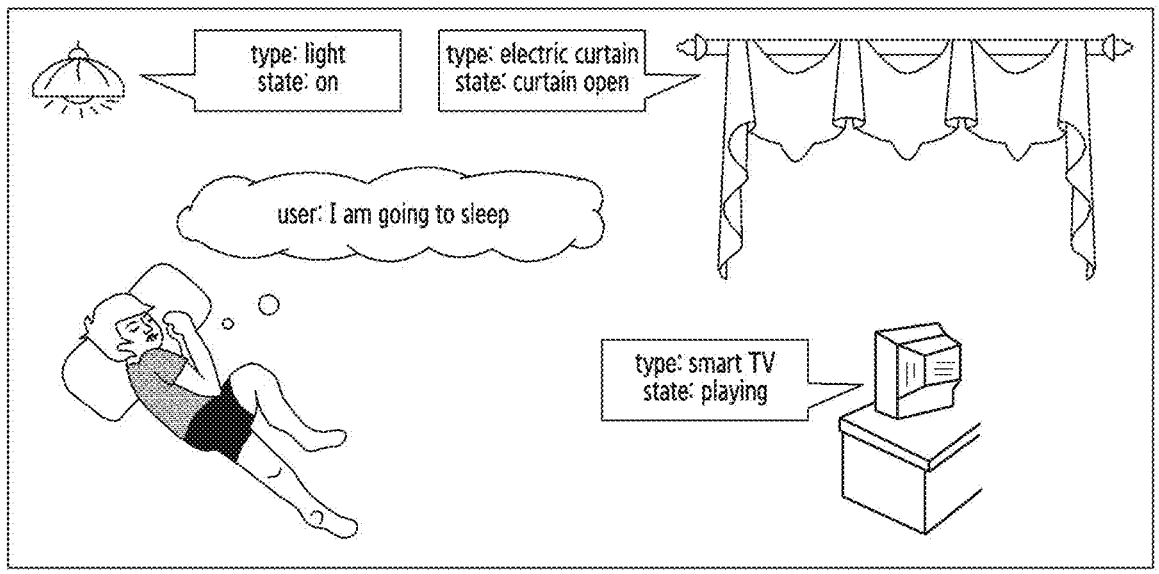
FIG. 8 is a schematic diagram of the example 3 according to an embodiment of the present disclosure.

Example 3: Determining the User's Intention by Each Smart Device According to the Scene, Through a Predefined Scene, Thereby Performing Corresponding Operations For example, as shown in FIG. 8, when the user is ready to sleep in the bedroom, the voice command "I am going to sleep" is issued, and there are certain requirements for the external environment such as illumination, sound and temperature. At this time, the state of the equipment in the bedroom includes the lights on, the electric curtains open, and the TV playing. This requires the cooperation of multiple corresponding devices to provide the user with a scene suitable for sleep, such as closing the curtains, turning off the TV, turning off the lights, and the like. The specific process can be divided into the following steps:

Step 3.1: Obtaining the voice command of the user; and obtaining other information, such as device status, location, and the like.

Step 3.2: On the basis of step S1031, further perform scene determination: determining a target scene based on the input instruction, and acquiring scene information of the target scene, and determining the scene information as an intention analysis result, the specific steps are as follows:

1) Extract intention analysis results in the text, including but not limited to shallow syntax features, word vectors, and the like.

2) Perform classification of intention domain to obtain classification results of intention domain;

3) If the classification result of the intention domain is a scene, the scene information of the corresponding target scene is obtained in the offline trained scene definition table (see Table 6), in this example, which is the sleep scene, and the scene information is input as the classification result of intention domain.

In this example, voice analysis is performed on the voice command, and then the intention analysis results in the text are extracted to obtain the target scene "sleeping", and the corresponding scene information in the scene definition table is "adjust temperature to 20~23 degrees, adjust humidity to 75~80%, adjust decibel value to 0~40 dB, and adjust light to 0 LUX".

Step 3.3: Extraction features of other information, get a feature list {TV_Run, Speaker_Idle, Air Conditioner_Idle, Humidifier_Idle, Curtain_Open, Temperature_24, Humidity_35%, Decibel_40dB, Illumination_50LUX.}, a joint vector representation (ie, a multi-modal feature representation) of the multi-modal data is obtained by concatenating the intention analysis results.

Step 3.4: With the feature fusion network of FIG. 3, the joint vector representation will obtain a further fusion representation to obtain a multi-modal fusion feature representation.

Step 3.5: With device selection network of FIG. 4, the device/device group is sorted. For the device group, the command and device are performed to match together with the similar manner of FIG. 7B, such as "adjust air condition-temperature to 20~23 degrees, adjust humidifier-humidity to 75%, adjust TV-sound decibel value to below 40 dB, adjust curtain-light to 0 LUX" and the like.

Step 3.6: Generate an execution command.

Figure 9A:
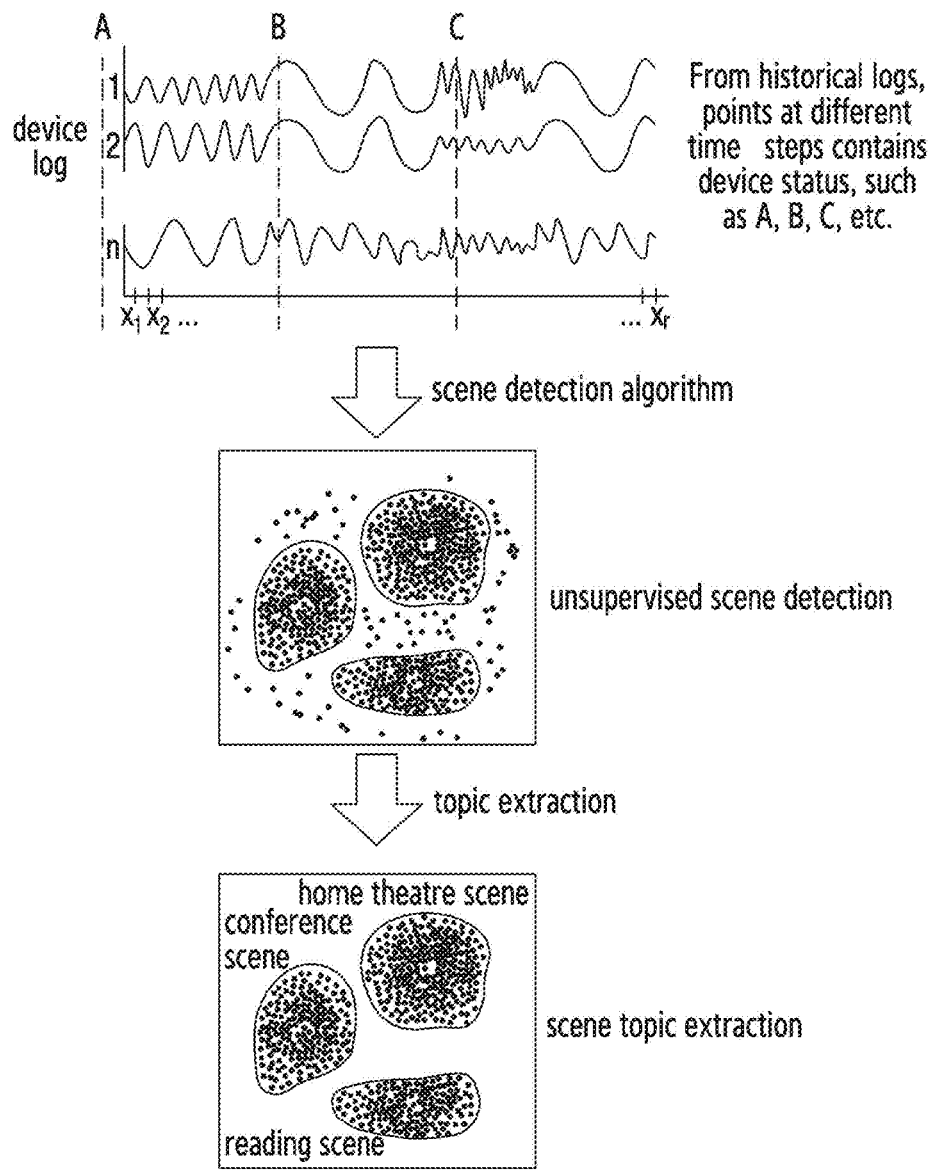
FIG. 9A is a schematic diagram of scene profile extraction according to an embodiment of the present application.

In the embodiment of the present application, the scene definition table in step 3.2 may be obtained by offline training, wherein the acquisition process of the scene definition table may also be referred to as the extraction process of scene profile (that is, scene information, describing the target status in the corresponding scene). As shown in FIG. 9A, a scheme for scene profile extraction is provided. Simple scenes can be created by manual operation, and complex scenes need to be learned through offline history logs. The learning framework for scene profile includes time-based unsupervised device clustering and theme model-based scene topic extraction. Specifically, 1. Collect the status of all devices according to the preset period (for example, the status of the device included in the history log at different time points, such as A, B, C, etc.), and obtain the device status point set. For example, extract the device status at different times in the history log, or periodically collect all device states from each time window to form a group of device status points.

Figure 9B:
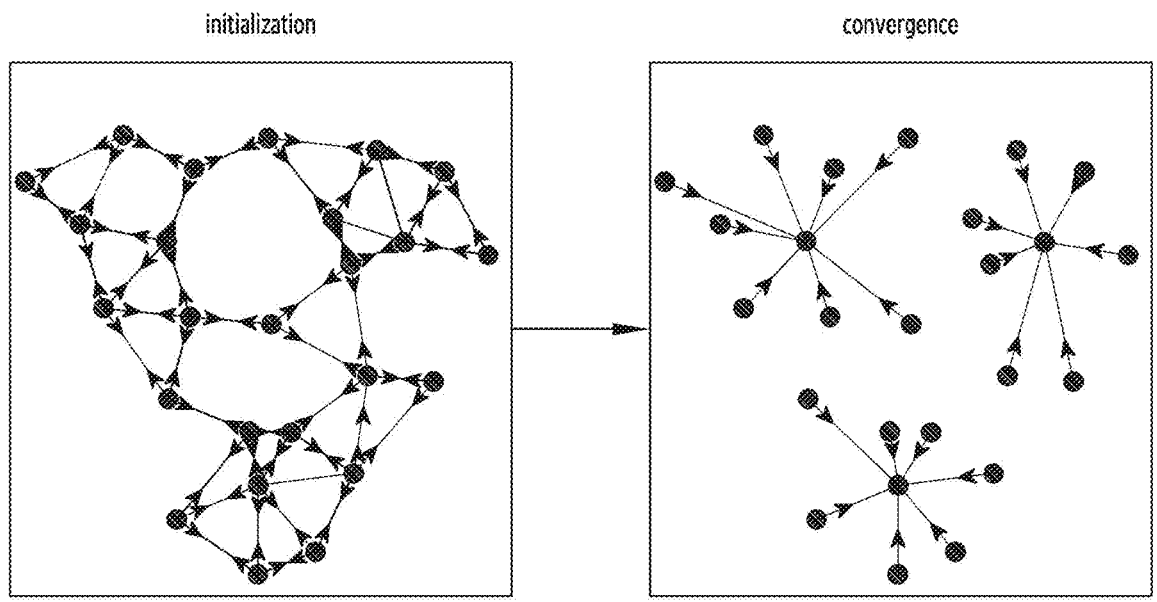
FIG. 9B is a schematic diagram of device state clustering according to an embodiment of the present application.

2. The device state point set is grouped and clustered by the scene extraction algorithm, and a device state points subset corresponding to each scene is obtained based on the clustering result, the target state of the device in each scene is determined according to the cluster centroid corresponding to each device state point subset. In practical applications, similar device state points (of the same state of the device at different times) can be grouped into the same cluster, each cluster corresponding to a certain scene, through an unsupervised learning algorithm (also called unsupervised scene detection algorithm). At the same time, the characteristics of the cluster centroid of each cluster should be determined, and the device state in the cluster centroid can serve as the target state of the device in the scene, thereby the optimized target set corresponding to the scene is obtained. As shown in FIG. 9B, the specific device status of the unsupervised scene classification is provided, and the initialized data convergence is used to obtain the device status corresponding to each scene, and finally the same device status is clustered together.

Figure 9C:
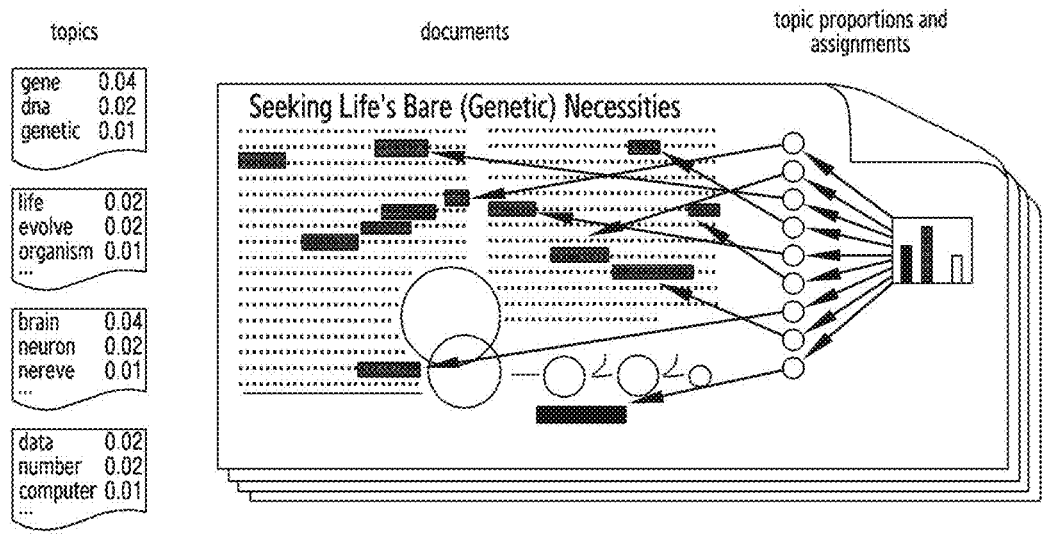
FIG. 9C is a schematic diagram of topic extraction according to an embodiment of the present application.

3. Determine the scene information of each scene according to the target state of the device in each scene, that is, extract an appropriate scene description for each cluster (for example, a home theater scene, a conference scene, a reading scene, etc.), and in actual applications, the topic extraction method can be used for scene topic extraction: as shown in FIG. 9C, all user instructions need to be collected to form a document (corresponding to the English document part in FIG. 9C, wherein the document shown in FIG. 9C is only an example, and the specific content of the document is not concerned in the application scheme, the content of the document part in the drawing does not affect the implementation of the scheme of the present application, only is the indication of the execution process), and then the proportion allocation is performed according to different theme (corresponding to the theme allocation proportion in FIG. 9C, similarly, the theme allocation proportion shown in FIG. 9C is only illustrative, and the solution of the present application does not focus on a specific numerical value, and the specific numerical value does not affect the implementation of the solution of the present application). The theme of specific cluster (scene) is extracted according to the theme proportional distribution result (such as the leftmost multiple of theme in FIG. 9C, similarly, the extracted theme in FIG. 9C is only for illustration, the present application does not focus on specific content, the content does not affect the specific embodiments of the present application). When studying scene profile offline, the scene name of each cluster can be learned. When scene recognition is performed online, the scene name can be recognized from the user command.

In the embodiment of the present application, for a complex scene, a concept of a scene profile is proposed, and with the unsupervised scene detection and the scene topic extraction, the automatic configuration and adjustment of target state of the device is implemented.

In this example, when the multi-device cooperative response is involved, the scene detection is invoked based on the user command, the target scene is determined, and the scene information of the target scene is used as the intention analysis result, and the word vectors corresponding to other data form a multi-modal feature representation to be input into features fusion network to form a multi-modal fusion feature representation. Finally, the multi-modal fusion feature representation obtains the optimal execution device group through the device selection network, and the device in the scene is adjusted to the corresponding target state of the scene information.

In the prior art, the user is required to manually set the target state of each device in a predefined scene, and the adaptability is poor. For example, in a sleep scene, the user can specify in advance through the control panel of the smart device that the target state of the light in this scene is off, the target state of the television is off, and the target state of the window is closed. By the target state of the device in the preset scene, when the user says "switching to the sleep mode", it is known that the user intention is to enter the sleep scene by capturing the mode keyword such as sleep, thereby adjusting the device corresponding to the scene to reach the preset state. That is, the prior art cannot learn the scene corresponding to the command through automatic scene learning, and automatically adjust the target state of the device in the scene.

What the steady state of multiple devices at the same time is summarized in a specific scene is provided in the implementation of the application. After the command is issued, the user can determines whether the corresponding command corresponds to a scene, what kind of scene it corresponds to through scene recognition, and determines the intention analysis result. The device status is adjusted according to the scene state to reach the target state corresponding to the scene and satisfy the user intention.

In actual applications, when users need to occupy one or more devices for a long time, they can adjust the parameters of these devices to keep the device or environment in a certain state. In addition, it does not contain the indispensable concept, such as for "I'm going to go out", this is a scene of going out, the operations involved at this time have lights off, curtains open, TV off, and the like.

Figure 10:
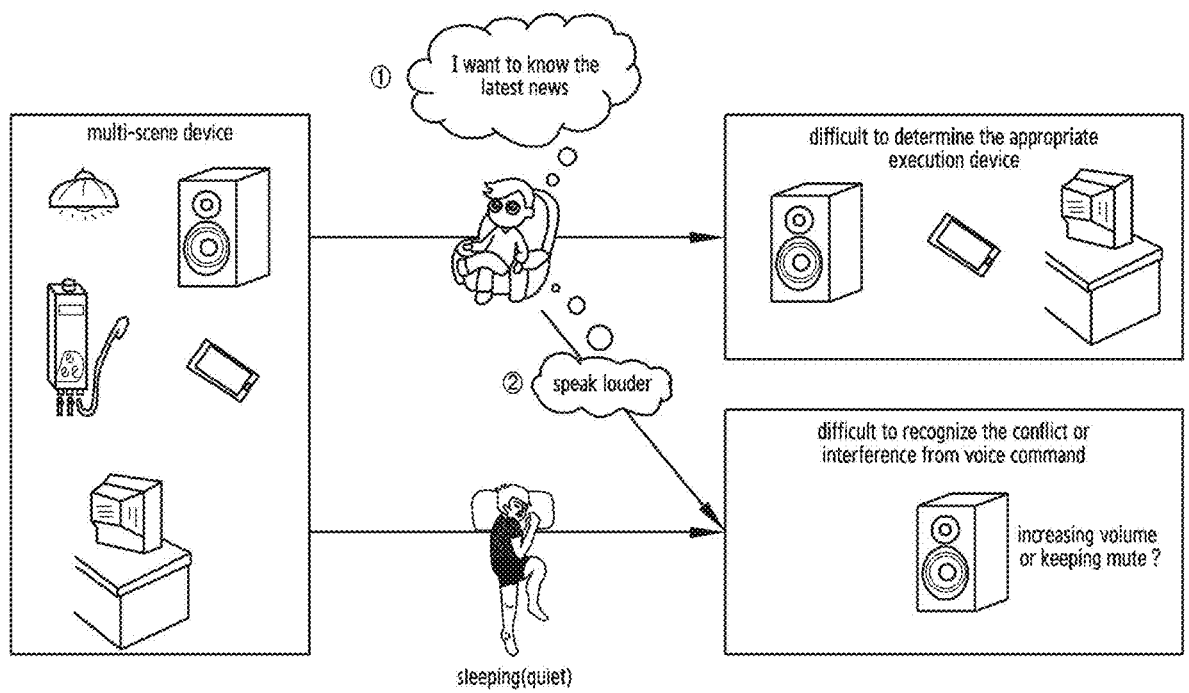
FIG. 10 is a schematic diagram that the conflict is difficult to process in prior art according to an embodiment of the present application.

The inventor of the present application has also found that how to accurately recognize the conflict or interference caused by voice commands is also a technical difficulty in the current voice operation device. For example, as shown in FIG. 10, when the voice command of the user A for the smart speaker is "speak louder", and the user B needs a quiet environment at this time, it is difficult for the smart speaker to determine that the operation to be performed is increasing volume or keeping mute, this is one of the difficulties of the prior art.

Figure 11:
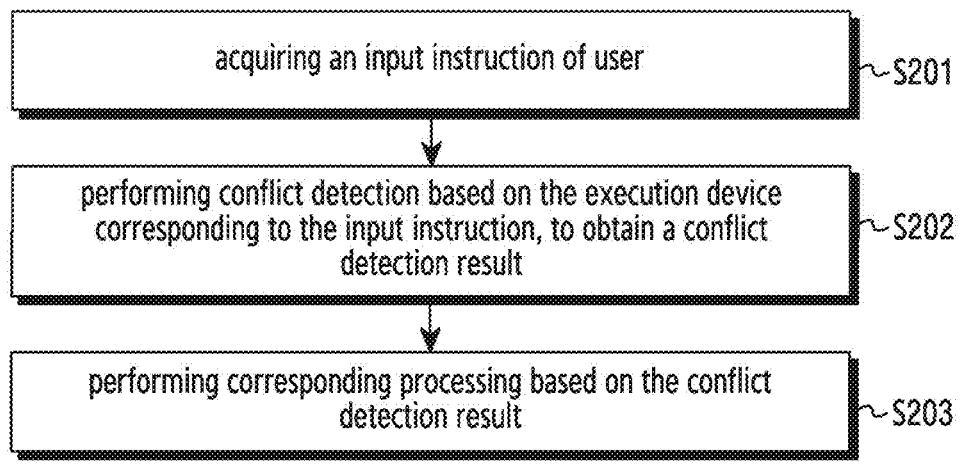
FIG. 11 is a schematic flowchart diagram of a conflict processing method according to an embodiment of the present application.

Based on this, the embodiment of the present application further provides a conflict processing method, as shown in FIG. 11, the method includes:

Step S201: acquiring an input instruction of user;

Step S202: performing conflict detection based on the execution device corresponding to the input instruction, and obtaining a conflict detection result; and Step S203: performing corresponding processing based on the conflict detection result.

In the embodiment of the present application, the execution device corresponding to the input instruction may be selected by any of the foregoing embodiments, or may be determined by other means, for example, the user directly specifies.

In an embodiment of the present application, when the execution device corresponding to the input instruction is to be executed, the currently running device may interfere with the device to be executed. In the embodiment of the present application, the behavior pattern recognition (BPR) is used for determining the interference device, that is, performing device conflict detection. The interference device is adjusted accordingly to reduce or even eliminate interference, so that other devices respond better to the user's request.

Specifically, the behavior pattern prediction is performed on the device state of the execution device, and further, whether there is a conflict between the devices is confirmed according to the prediction result of the behavior pattern. If a conflict between devices is detected, conflict processing is performed, otherwise the execution device is still controlled to execute the input command.

Wherein, behavior pattern prediction is based on offline behavior pattern detection. The purpose of behavior pattern detection is to automatically learn whether there is a conflict with an already occurring behavior after a certain behavior occurs. If the probability or correlation of the collision occurs, for example, if the conflict is determined to be a conflict when exceeds the threshold, the corresponding conflict processing is performed.

Figure 12A:
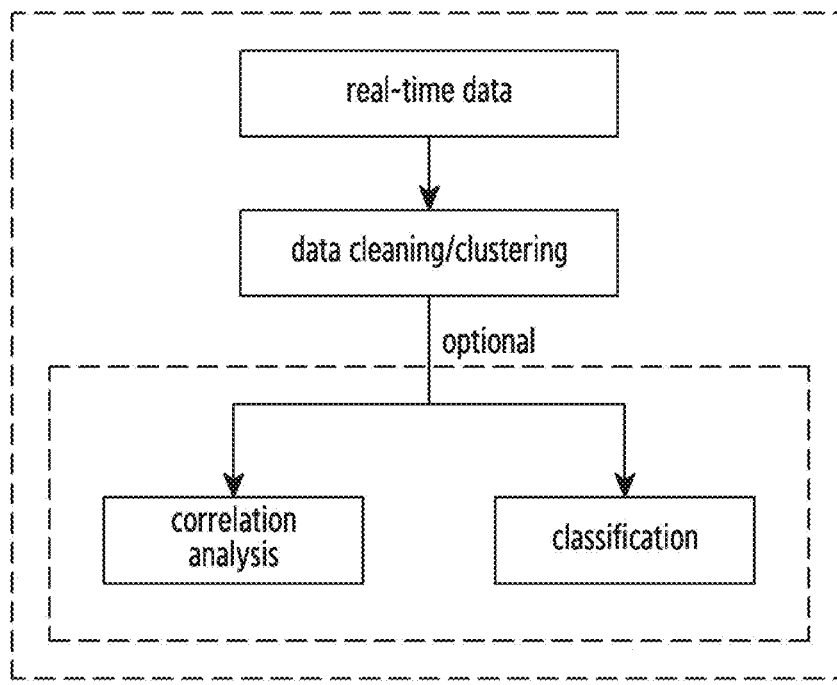
FIG. 12A is a schematic diagram 1 of behavior pattern detection according to an embodiment of the present application.
Figure 12B:
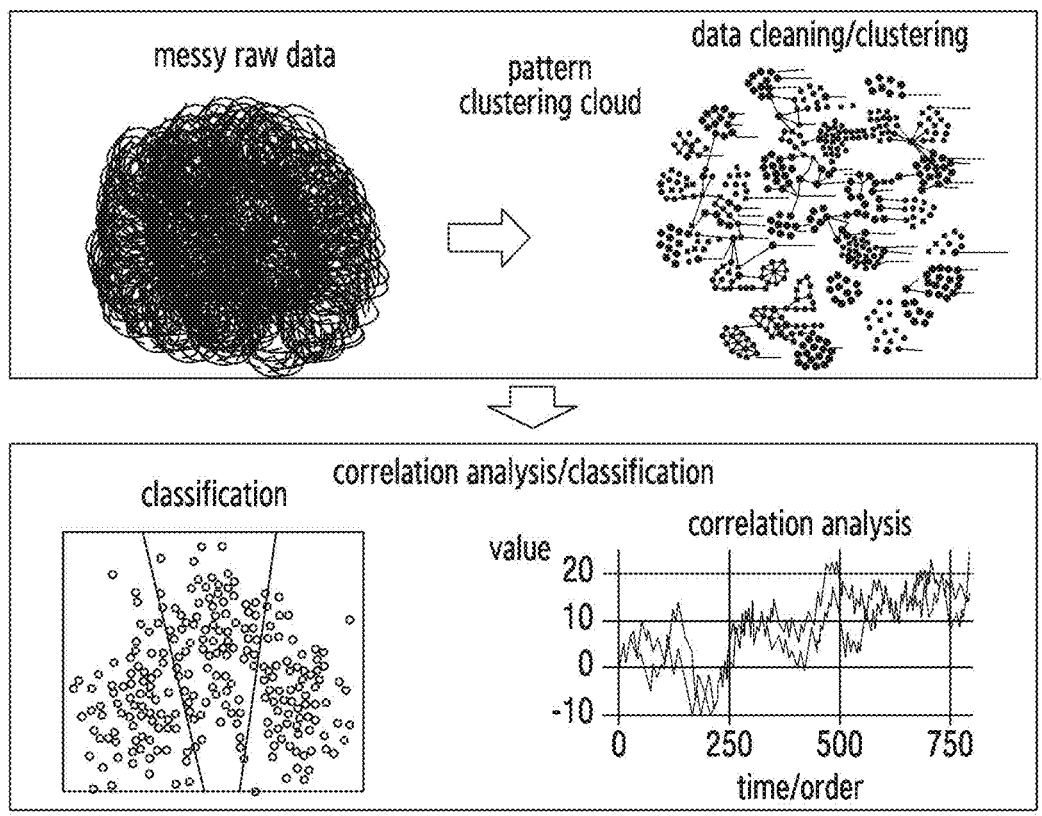
FIG. 12B is a schematic diagram 2 of behavior pattern detection according to an embodiment of the present application.

An example of the behavior pattern detection is shown in FIG. 12A and FIG. 12B. The specific content shown in FIG. 12A and FIG. 12B does not constitute a limitation on the embodiment of the present application, and only a schematic representation of the processing involved in the embodiments of the present application is shown. Wherein, BPR is used to help recognize potential conflicting devices. The specific introduction of the specific BPR is given below. The real-time data in FIG. 12A is behavior data. The specific steps are as follows:

Large-scale device behavior patterns are detected from real-time data through data cleaning/clustering, such as reduction of TV sound when making a call, and such conflicting patterns are gathered together. The results of the clustering will be trained in the classification model or correlation analysis, both of which can detect conflicts between devices.

1. If the classification is selected to recognize conflicts, the manually labeled device behavior pattern data will be used to train the model that identifies the conflict. During the conflict determination, when the execution device is controlled to execute the input instruction, the potential conflicting device of the execution device is obtained through the pre-trained classification model, and the conflict detection is performed according to the device state of the execution device and the device state of the potentially conflicting device, and the current user is associated with a potential conflicting device (including status values) when operating the device, and it can be seen if a conflict has occurred by checking the state of the device.

2. If a correlation analysis (including Pearson correlation, Kendall rank correlation, Spearman correlation, and Point-Biserial correlation) is selected, the correlation model is derived based on the clustering results. In the process of controlling the execution device to perform the input instruction, through the pre-trained correlation model, the related device that satisfies the predetermined correlation coefficient with the execution device is obtained. The conflict detection is performed according to the device state of the related device and the device state of the execution device, and the correlation coefficient between the target device with other devices is calculated by the model when the target device is operated. If the correlation coefficient is smaller, the correlation is lower, and the conflict is lower. If the correlation is larger, the probability of collision is greater. At this time, conflict processing is required.

In the embodiment of the present application, in order to solve the device conflict, a behavior prediction method is proposed to perform behavior pattern recognition. Compared with the traditional BPR that most frequently uses clustering, the embodiment of the present application applies it to the field of Internet of Things for the first time, and the time series-based classification and correlation analysis is added to determine device conflicts.

As an example, when a user inputs a voice command, the state of other devices may interfere with the execution of the target device.

Figure 13:
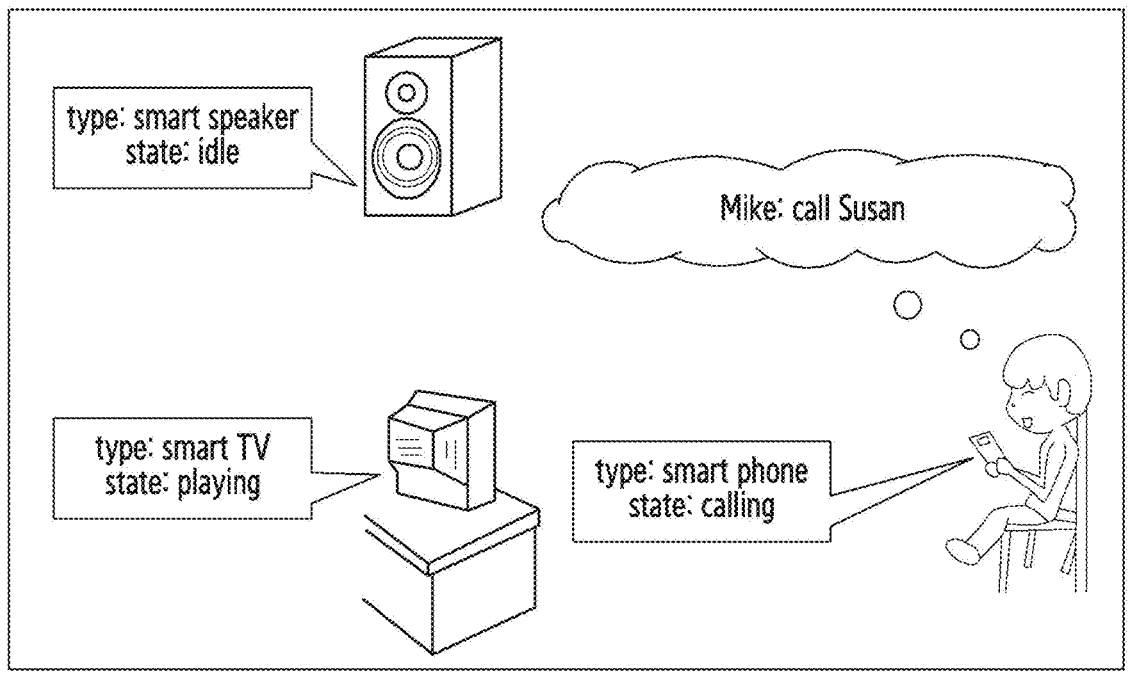
FIG. 13 is a schematic diagram of device conflicts according to an embodiment of the present application.

For example, as shown in FIG. 13, when the user is in the living room, the television is in the playing state, if the user issues a voice command "call Susan", the phone starts to perform the call operation. During the user's call, the TV will interfere with the user's call, it is needed to decrease the volume of the TV accordingly. The prior art cannot automatically determine the interference between devices, so it is impossible to reduce the volume of the potential interference device TV.

In the embodiment of the present application, the specific process for solving the problem is as follows:

Step 4.1: Recognize and analyze the user's voice command, obtain the intention analysis result, form a multi-modal feature representation by combining the intention analysis result and the word vectors corresponding to other data, and input the multi-modal feature representation into the feature fusion network to form a multi-modal fusion feature representation, and the multi-modal fusion feature representation determines that the mobile phone is the execution device by device selection network, then the command production module generates the dialing command of the mobile phone. Or, the mobile phone directly receives the dialing command that the user clicks. That is, the device conflict detection at this time may be performed during the processing of controlling the execution device to execute a corresponding operation.

Step 4.2: According to the established behavior pattern detection model, behavior pattern prediction is performed with the device state of currently selected target device (mobile phone) and the current device state of other device to, and then the conflict detection result as shown in Table 7 is obtained.

TABLE 7

| Conflict detection result | Correlation probability | Conflict or not (over the conflict threshold 0.7 manually set) |
|---|---|---|
| Call/dial-TV/playing | 0.8 | Yes |
| Call/dial-sound/off | 0.002 | No |

Step 4.3: When it is detected that there is a conflicting device, the conflicting device is controlled to perform a corresponding operation. According to the conflict detection result shown in Table 7, there is a conflict between the running TV and the dialing call, so a command to resolve the conflict "TV-Volume Down" is generated. The interruption to the current user is eliminated by adjusting the interference device. The volume of the TV in this example will be lowered and will not be reused until the end of the call. After the conflict is processed, the user continues to perform the call.

In another embodiment of the present application, if the execution device corresponding to the input instruction executes the user's command, it may conflict with the requirements of other users. This problem may be considered as a conflict between users, and may also be considered as a user does not exit the current scene and another user needs to invoke the device, the target state required to maintain the current scene is destroyed, which results in conflicts between the scenes.

Figure 14:
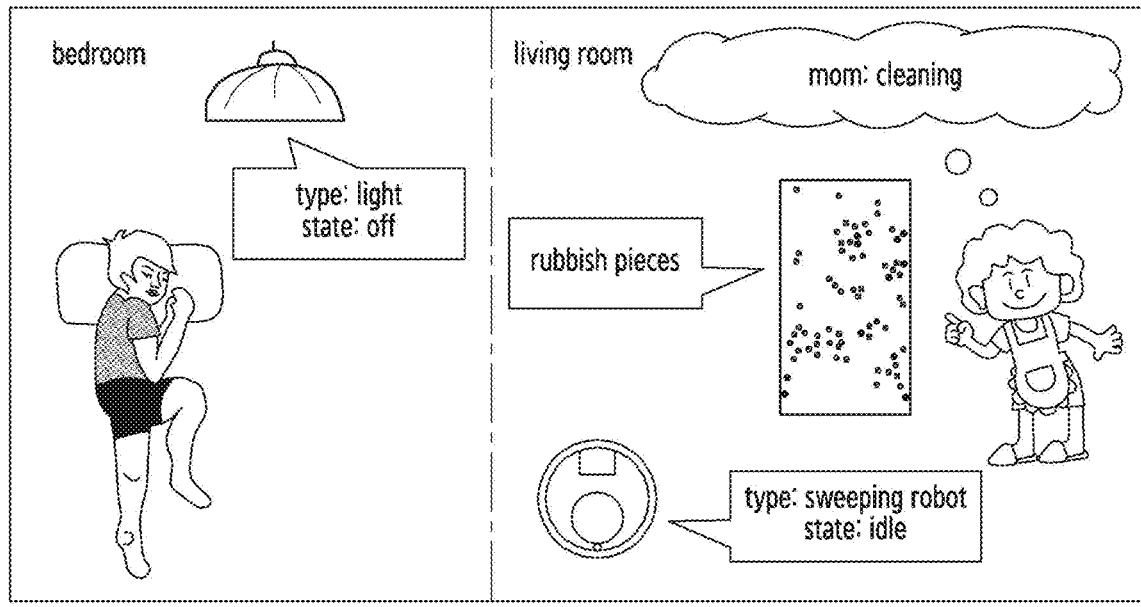
FIG. 14 is a schematic diagram of a scene conflict according to an embodiment of the present application.

As an example, as shown in FIG. 14, the user A sleeps in the bedroom, and the user B issues "clean" in the living room, and the sweeping robot is invoked. At this time, the noise of the sweeping robot will disturb the user A in the sleeping scene (over the defined threshold on the sound in the sleeping scene), and the prior art cannot automatically determine the scene interference and provide a solution.

In the embodiment of the present application, the specific process for solving the problem is as follows:

Step 5.1: Recognize and analyze the user's voice instruction (in this example, the corresponding instruction is "clean"), obtain the intention analysis result, and a multi-modal feature representation is formed by combining the intention analysis result and the word vectors corresponding to other data, and the multi-modal feature representation is input into the feature fusion network to form a multi-modal fusion feature representation, and the multi-modal fusion feature representation obtains the execution device through the device selection network (in this example, the selected execution device is a "sweeping robot").

Step 5.2: Perform scene conflict detection before controlling the execution device to execute the input instruction: acquiring current scene information, including but not limited to temperature, humidity, sound intensity, light intensity, and the like. A conflict detection is performed on the execution device, the input instruction, and the current scene information. If the device to be operated next has an impact on the environmental characteristics that exceeds an acceptable range, it is determined that there is a scene conflict. In the above example, it is necessary to determine whether the sweeping robot to be started will collide with the scene, for example, the sound intensity exceeds the threshold of the "sleeping" scene.

Step 5.3: The corresponding processing manner includes: when a scene conflict is detected, a scene conflict prompt is transmitted to the execution device; and when receiving the user's continuing execution instruction, the execution device is controlled to execute the input instruction. If there is an environmental conflict, it may be further determined whether the speaker is consistent with the previous user, that is, according to the input instruction, the user identity information is obtained; when it is determined that the user identity information is inconsistent with the user identity information corresponding to the current scene information, a scene conflict prompt is transmitted to the execution device. The potential conflict is fed back to the current user, prompting that continuing the execution of the command will interfere with the existing scene, and providing the current state of the conflicting device. In the above example, due to the issuer of the "cleaning" command and the issuer of the "sleeping" command is inconsistent, the sweeping robot issues an environmental conflict prompt, which makes the current user to decide whether to continue execution, if the issuer of the "cleaning" command needs to continue execution, the sweep command is executed, otherwise give up execution, or until the issuer of the "sleeping" command wakes up and ends the sleeping scene, the sweeping robot begins to perform the cleaning mission. Alternatively, the user authority may be judged when the conflict is processed. For example, if the authority to the scene of the speaker is lower than that of the previous user, the speaker's command is not executed; otherwise, the sweeping robot issues an environmental conflict prompt, which makes the current user to determine whether to continue execution.

The embodiment of the present application determines and resolves scene conflicts caused by different users from the perspective of the user rather than the device, and improves the user experience.

Figure 15A:
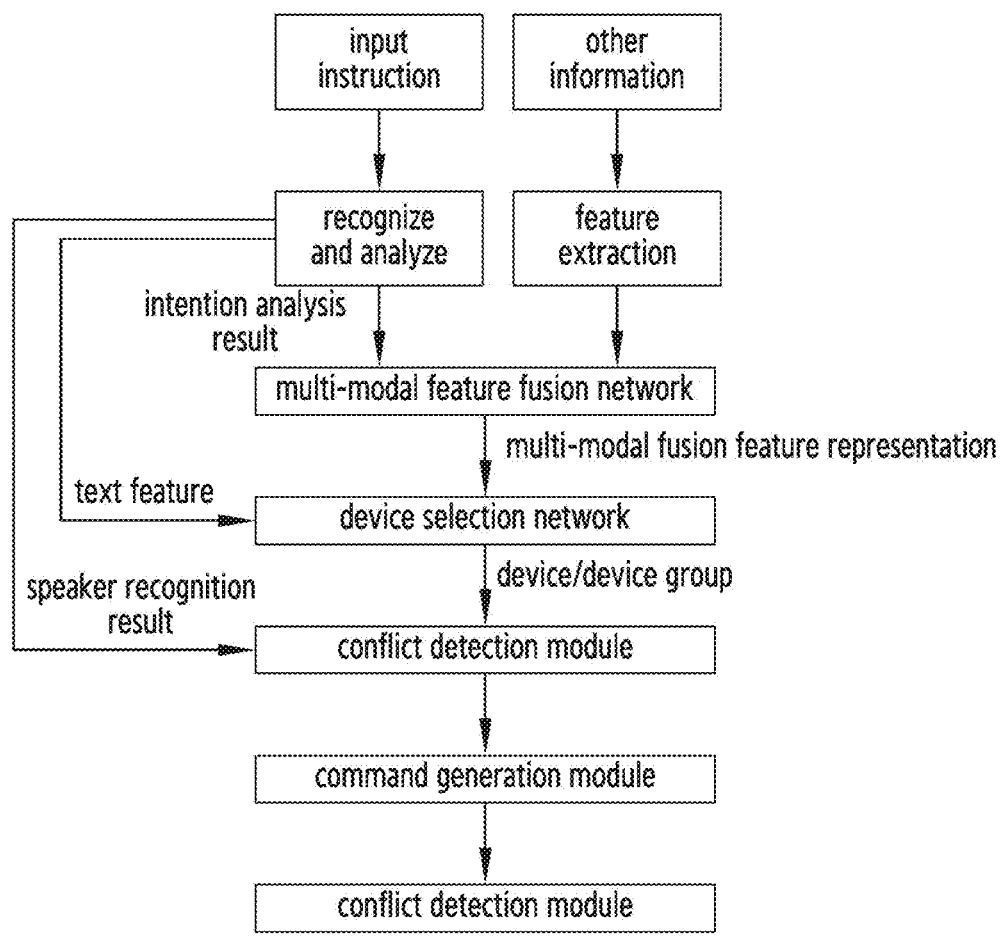
FIG. 15A is a schematic flowchart diagram of a complete conflict processing according to an embodiment of the present application.

In the embodiment of the present application, as shown in FIG. 15A, on the basis of FIG. 5, a complete conflict processing flow is proposed.

Specifically, the input instruction is performed to recognize and analyze to obtain an intention analysis result, and then input it into feature fusion network (corresponding to the multi-modal feature fusion network in FIG. 15A). At the same time, after extracting features from at least one of user information, environment information, and device information (corresponding to other information in FIG. 15A), the extracted feature is input into the feature fusion network. The feature fusion network outputs multi-modal fusion feature representation and inputs it into the device selection network. At the same time, the text feature obtained through performing recognizing and analyzing on the input instruction is input into the device selection network. The device selection network outputs the selected device or device group. At this time, the conflict detection module may be used for performing conflict detection or processing before or after the command production module generates the manipulation instructions of the devices or device groups. If it is before the command production module generates the manipulation instructions of the devices or device groups, a scene conflict detection is performed. It is determined by the device status table that the currently existing scene and the scene profile determine whether the calling execution device in the scene will cause a scene conflict, where the conflict detection module needs to obtain the identification result of the speaker corresponding to the input instruction. If it is after the command production module generates the manipulation instructions of the device or the device groups, the device conflict detection is performed. It is determined whether there is a device conflict by analyzing and determining the status of the execution device and other device through invoking the behavior pattern, if the conflict exists, performing the corresponding conflict processing.

Embodiments of the present invention relate to the specific manipulation of the intelligent networking device by the user instruction, including online and offline. The online part includes the device control method and the conflict processing method described in the above embodiments. The offline part includes obtaining scene profile, behavior patterns, device profile, user profile, behavior pattern detection, etc. from specific historical data through machine learning algorithms or data preprocessing, and the obtained data can be called for online part.

Wherein the online part can be performed in the cloud and/or the local brain (local device or machine, which can play a similar role with the cloud, the local brain can be a fixed all-in-one, or it is not fixed device with storage and computing functions, according to the function and calculating power, etc.). If processed in the cloud, after the device receives the instruction, the private data during the input (including the command and other inputs) will be encrypted (if the instruction is the voice command, each frame of the audio needs to be encrypted) and then uploaded, and processed in the cloud after decryption. A final execution command is generated in the cloud and is transmitted to the device for execution. If processed in the local brain, there is no need to upload the input, all operations are performed locally, and the final execution command is generated. If data transmission between local devices is involved, even in the local area network, the private data needs to be encrypted. If processed in both the local brain and the cloud, the local brain can perform voice analysis and feature extraction, and then the encrypted results are transmitted to the cloud, and are subsequently processed as input with the long-term features of the cloud. Finally, the execution command is generated in the cloud and transmitted to the device for execution.

Figure 15B:
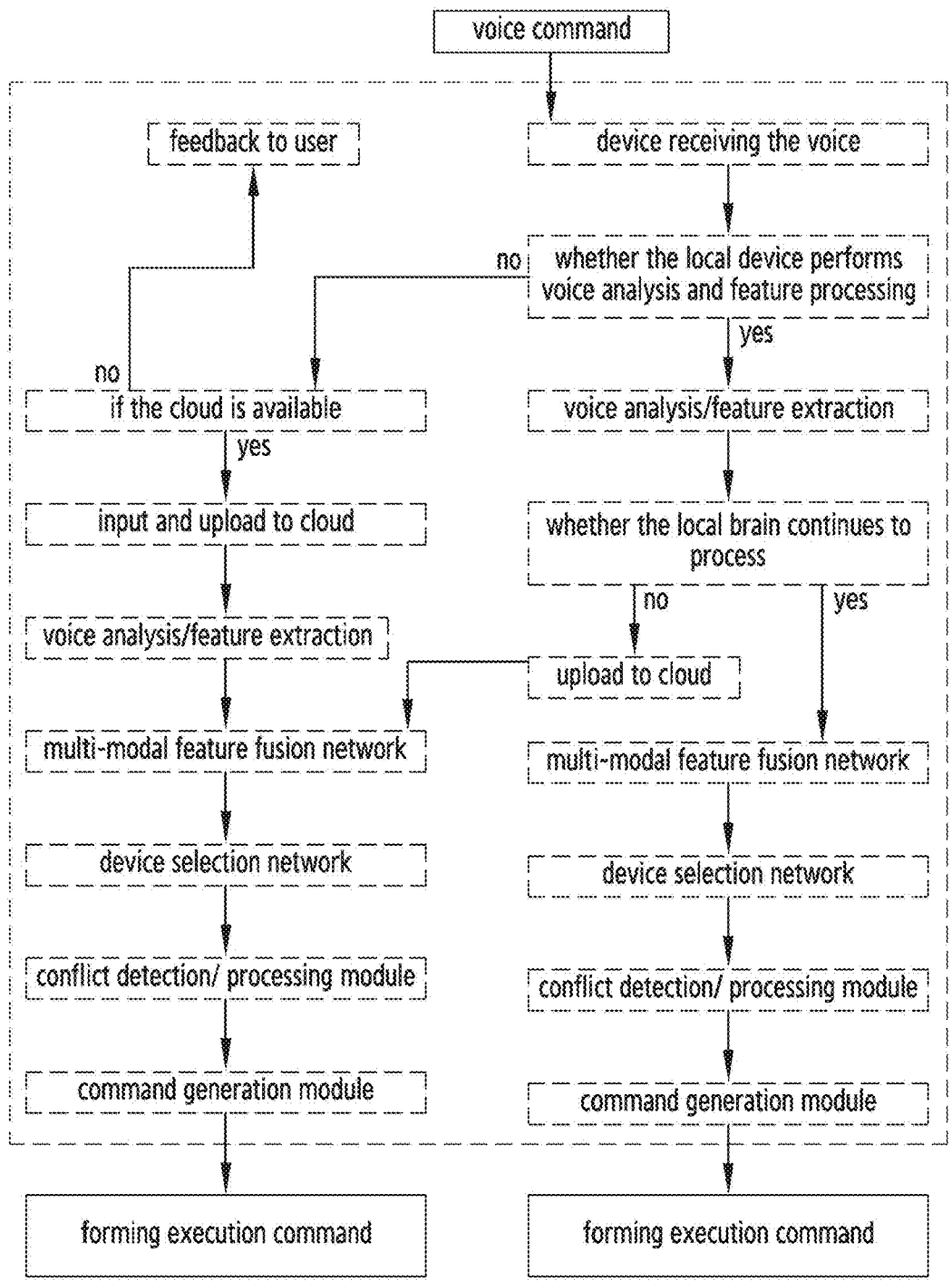
FIG. 15B is a schematic diagram of cloud and local brain conversion logic according to an embodiment of the present application.

The specific transformation logic between the cloud and the local brain is shown in FIG. 15B. After receiving the voice command from the user, it is determined that whether the local device can perform voice analysis/feature processing. If the local device can perform voice analysis/feature processing, it is after the voice analysis/feature processing, judging whether the local brain continues to process, and if so, the local brain processes the completion of the subsequent device selection operation (through the multi-modal feature fusion network, the device selection network, the conflict detection/processing module, the command generation module), and finally an execution command is formed. If the local device cannot perform voice analysis/feature processing, continuing to determine whether the cloud is available. If it is available, the input is uploaded to the cloud, and the cloud will complete the subsequent device selection operation (through the multi-modal feature fusion network, device selection network, conflict detection/processing module, command generation module). Finally, an execution command is formed. If the cloud is not available, it will directly feed back to the user and end the current process.

In the method provided by the embodiment of the present application, by means of multi-modal data, intention classification, behavior pattern analysis, scene analysis, the user intention is recognized, the correct execution device is determined, execution logic is formed, and potential device conflicts and user conflicts are simultaneously solved.

Figure 16:
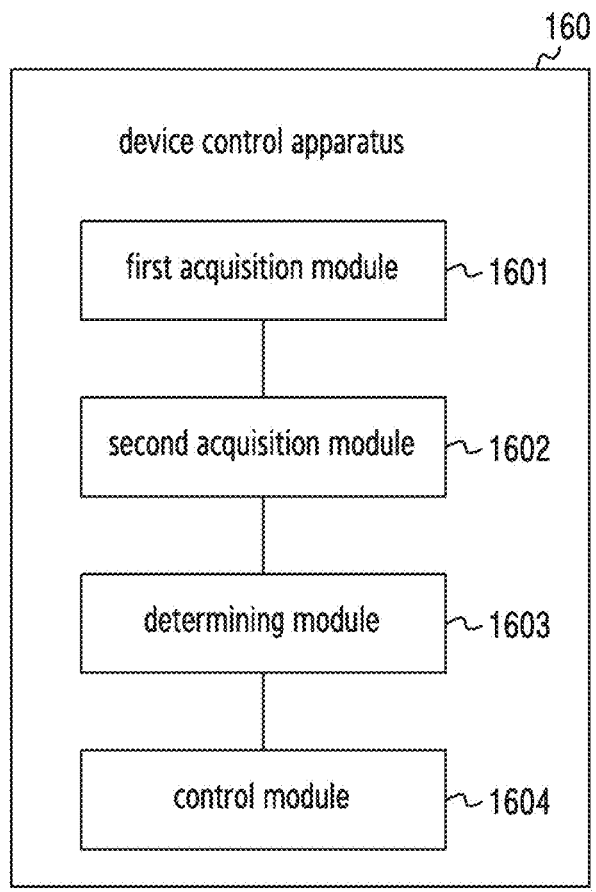
FIG. 16 is a schematic structural diagram of an apparatus for controlling device according to an embodiment of the present application.

The embodiment of the present application further provides a device control apparatus. As shown in FIG. 16, the device control apparatus 160 may include: a first acquisition module 1601, a second acquisition module 1602, a determining module 1603, and a control module 1604, wherein The first acquisition module 1601 is configured to acquire an input instruction of the user;
The second acquisition module 1602 is configured to acquire at least one of the following information: user information, environment information, device information;
The determining module 1603 is configured to determine, according to the acquired information and the input instruction, at least one execution device of the input instruction;
The control module 1604 is configured to control at least one execution device to perform a corresponding operation.

In an optional implementation manner, the determining module 1603 is configured to, when determining, according to the acquired information and the input instruction, the at least one execution device of the input instruction, specifically:
Acquire an intention analysis result corresponding to the input instruction;
Fuse the intention analysis result and the acquired information to obtain a corresponding multi-modal fusion feature representation;
Determine at least one execution device of the input instruction based on the multi-modal fusion feature representation and the input instruction.

In an optional implementation manner, the determining module 1603 is configured to: when the fusion processing on the intention analysis result and the acquired information is performed to obtain the corresponding multi-modal fusion feature representation, specifically:
Connect the intention analysis result and the acquired information to obtain a multi-modal feature representation;
Perform attention-weight processing on the multi-modal feature representation to obtain the corresponding multi-modal fusion feature representation through the feature fusion network.

In an optional implementation manner, the determining module 1603 is configured to when the intention analysis result and the acquired information is connected to obtain a multi-modal feature representation, specifically:
Determine the word vector respectively corresponding to the intention analysis result and the obtained information;
Connect each word vector to obtain a multi-modal feature representation.

In an optional implementation manner, the feature fusion network includes several fusion modules;
Any fusion module includes a multi-head attention layer, a fusion normalization layer and a fully connected layer;
The multi-head attention layer is used for performing the attention-weight processing on the input features of the fusion module to which it belongs;
The fusion normalization layer is used for fusing the input features and the attention-weighted feature of multi-head attention layer of the fusion module to which it belongs, and normalizing fusion result;
The fully connected layer is used for outputting the extracted feature after performing the extraction of the normalized processing result.

In an optional implementation manner, the determining module 1603 is configured to: when determining, according to the acquired information and the input instruction, the at least one execution device of input instruction, specifically:
A first contribution of each modal feature corresponding to the input instruction to the device selection and a second contribution of the word feature corresponding to the input instruction to the device selection are acquired through device selection network. At least one execution device of the input instruction is determined based on each modal feature, each word feature, the first contribution, and the second contribution.

In an optional implementation manner, the determining module 1603 is further configured to acquire each modal feature by:
Acquiring an intention analysis result corresponding to the input instruction;
Performing fusion processing on the intention analysis result and the acquired information to obtain a corresponding multi-modal fusion feature representation;
Determining each feature in the multi-modal fusion feature representation as a respective modal feature.

In an optional implementation manner, the device selection network includes a modal feature contribution determination network, a word feature contribution determination network, a classification network, and a device determination network;
The modal feature contribution determination network is used for attention-weighting to each modal feature to obtain each modal feature including the first contribution;
The word feature contribution determination network is configured to weight attention on each word feature based on each modal feature including the first contribution, to obtain each word feature including the second contribution;

The classification network is used to obtain an output device based on each modal feature including the first contribution and each word feature including the second contribution;

The device determination network is configured to obtain at least one execution device of the input instruction based on output device obtained by the classification network.

In an optional implementation manner, the classification network is configured to at least once obtain an output device based on each modal feature including the first contribution and each word feature including the second contribution;

The device determination network is configured to obtain at least one execution device of the input instruction according to the output device obtained by the classification network.

In an optional implementation manner, when the configured classification network obtains at least two output devices each time, the device determination network is specifically configured to:

If the number of times the output device is obtained through the classification network is once, an execution device is determined according to a probability corresponding to each output device obtained by the classification network;

If the number of times the output device is obtained through the classification network is at least twice, at least two execution devices are determined according to the probability respectively corresponding to the paths between each output device obtained by the classification network at least twice.

In an optional implementation manner, the device information includes at least one of the following:

Device status, device profile, device location information, device belonging scene, device user, device signal strength, device behavior pattern;

And/or, the user information includes at least one of the following:

User sentiment data, user profile, user location information;

And/or, the environmental information includes at least one of the following:

Sound intensity, light intensity, weather.

In an optional implementation manner, the determining module 1603 is configured to: when an intention analysis result corresponding to the input instruction is obtained, specifically:

Determining a target scene based on the input instruction, and acquiring scene information of the target scene;

Determining the scene information as an intention analysis result.

In an optional implementation manner, the determining module 1603 is configured to: when acquire the scene information of the target scene, specifically:

Acquiring the scene information of the target scene through a pre-trained scene definition table.

In an optional implementation manner, the device control apparatus 160 further includes a conflict detection processing module configured to perform conflict detection based on the at least one execution device, obtain a conflict detection result, and perform corresponding processing based on the conflict detection result.

In an optional implementation manner, the conflict detection includes device conflict detection. The conflict detection processing module is configured to, when perform conflict detection based on the execution device, specifically any one of the following:

When the execution device is controlled to execute the input instruction, the potential conflicting device of the execution device is obtained through the pre-trained classification module, and the conflict detection is performed according to the device state of the execution device and the device state of the potentially conflicting device;

When the execution device is controlled to execute the input instruction, the related device that satisfies the predetermined correlation coefficient with the execution device is obtained through the pre-trained correlation model, and the conflict detection is performed according to the device state of the related device and the device state of the execution device.

In an optional implementation manner, the conflict detection processing module is configured to: when performs corresponding processing based on the conflict detection result, specifically:

Control the conflicting device to perform a corresponding operation, when it is detected that there is a conflicting device.

In an optional implementation, the conflict detection includes a scene conflict detection, and the conflict detection processing module is configured to: when the conflict detection is performed based on the execution device before the execution device is controlled to execute the input instruction, specifically:

Acquire current scene information;

Perform conflict detection based on the execution device, the input instruction, and the current scene information.

In an optional implementation manner, the conflict detection processing module is configured to, when perform corresponding processing based on the conflict detection result, specifically:

Transmit a scene conflict prompt to execution device when a scene conflict is detected;

Control the execution device to execute input instruction when receiving continuation execution instruction from user.

In an optional implementation, the determining module 1603 is further configured to:

Obtain user identity information according to the input instruction;

The conflict detection processing module is configured to, when transmit a scene conflict prompt to the execution device, specifically:

When it is determined that the user identity information is inconsistent with the user identity information corresponding to the current scene information, a scene conflict prompt is transmitted to the execution device.

Those skilled in the art can clearly understand that the implementation principle and the technical effects of the device control apparatus provided by the embodiments of the present application are the same as the foregoing method embodiments, and for the convenient and concise description, the device embodiment parts which are not mentioned may refer to the corresponding content in the embodiments of foregoing method, and details are not described herein again.

Figure 17:
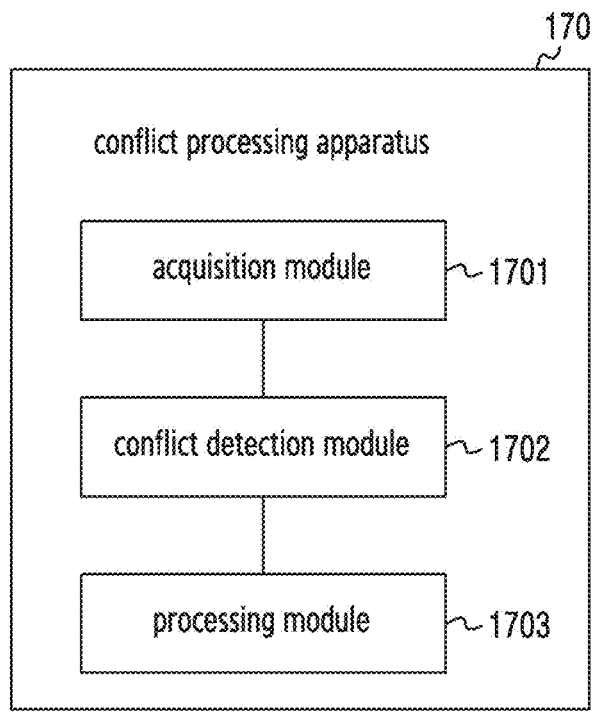
FIG. 17 is a schematic structural diagram of a conflict processing apparatus according to an embodiment of the present application.

The embodiment of the present application further provides a conflict processing apparatus. As shown in FIG. 17, the conflict processing apparatus 170 may include: an acquisition module 1701, a conflict detection module 1702, and a processing module 1703, wherein The acquisition module 1701 is configured to acquire an input instruction of user;

The conflict detection module 1702 is configured to perform conflict detection according to an execution device corresponding to the input instruction, to obtain a conflict detection result;

The processing module 1703 is configured to perform corresponding processing based on the conflict detection result.

In an optional implementation manner, the conflict detection includes device conflict detection, and the conflict detection module 1702 is configured to, when performing conflict detection based on the execution device, specifically any one of the following:

When the execution device is controlled to execute the input instruction, the potential conflicting device of the execution device is obtained through the pre-trained classification module, and the conflict detection is performed according to the device state of the execution device and the device state of the potentially conflicting device;

When the execution device is controlled to execute the input instruction, the related device that satisfies the predetermined correlation coefficient with the execution device is obtained through the pre-trained correlation model, and the conflict detection is performed according to the device state of the related device and the device state of the execution device.

In an optional implementation manner, the processing module 1703 is configured to, when perform corresponding processing based on the conflict detection result, specifically:

When it is detected that there is a conflicting device, the conflicting device is controlled to perform a corresponding operation.

In an optional implementation, the conflict detection includes a scene conflict detection, and the conflict detection module 1702 is configured to, when the conflict detection is performed based on the execution device before the execution device is controlled to execute the input instruction, specifically:

Acquire current scene information;

Perform conflict detection based on the execution device, the input instruction, and the current scene information.

In an optional implementation manner, the processing module 1703 is configured to, when perform corresponding processing based on the conflict detection result, specifically:

Transmit a scene conflict prompt to execution device when a scene conflict is detected;

Control the execution device to execute input instruction when receiving continuation execution instruction from user.

In an optional implementation, the processing module 1703 is further configured to obtain user identity information according to the input instruction;

The processing module 1703 is configured to, when transmits a scene conflict prompt to the execution device, specifically:

When it is determined that the user identity information is inconsistent with the user identity information corresponding to the current scene information, a scene conflict prompt is transmitted to the execution device.

Those skilled in the art can clearly understand that the implementation principle and the technical effects of the conflict processing apparatus provided by the embodiments of the present application are the same as the foregoing method embodiments, and for the convenient and concise description, the device embodiment parts which are not mentioned may refer to the corresponding content in the embodiments of foregoing method, and details are not described herein again.

An embodiment of the present application further provides an electronic device, including: a processor and a memory, where the memory stores at least one instruction, at least one program, a code set, or a set of instructions, the at least one instruction, the at least one program, the code set, or the instruction set are loaded and executed by the processor to implement the corresponding content in the foregoing method embodiments.

Optionally, the electronic device can also include a transceiver. The processor is connected to the transceiver, such as via a bus. It should be noted that, in the actual application, the transceiver is not limited to one, and the structure of the electronic device does not constitute a limitation on the embodiment of the present application.

The processor can be a CPU, a general purpose processor, a DSP, an ASIC, an FPGA or other programmable logic device, a transistor logic device, a hardware component, or any combination thereof. It is possible to implement or carry out the various illustrative logical blocks, modules and circuits described in connection with the present disclosure. The processor can also be a combination implementing the computing functions, for example, including one or more microprocessor combinations, a combination of a DSP and a microprocessor, and the like.

The bus can include a path for communicating information between the components described above. The bus can be a PCI bus or an EISA bus. The bus can be classified into an address bus, a data bus, a control bus, and the like. The memory can be ROM or other types of static storage devices that can store static information and instructions, RAM or other types of dynamic storage devices that can store information and instructions, or EEPROM, CD-ROM or other optical disk storage, optical disk storage (including compressed optical discs, laser discs, optical discs, digital versatile discs, Blu-ray discs, etc.), magnetic disk storage media or other magnetic storage devices, or any other media capable of carrying out or storing desired program code in the form of instructions or data structures and accessing by a computer, but not limited to this.

The embodiment of the present application further provides a computer readable storage medium for storing computer instructions, when executed on a computer, enable the computer to execute the corresponding content in the foregoing method embodiments.

It should be understood that although the various steps in the flowchart of the drawings are sequentially illustrative as indicated by the arrows, these steps are not necessarily performed in the order indicated by the arrows. Unless explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different times, and the execution order thereof is also not necessarily performed sequentially, but may be performed in turn or alternately with at least a portion of other steps or sub-steps or stages of other steps.

The above description is only a partial embodiment of the present application, and it should be noted that those skilled in the art can also make some improvements and retouching without departing from the principle of the present application, which should be considered as the scope of protection of this application.

The invention claimed is:

1. A method performed by a first device, the method comprising:
    acquiring an input instruction of a user;
    identifying whether the input instruction specifies any specific execution device;
    determining at least one second device corresponding to the input instruction based on the identification, the determining of the at least one second device corresponding to the input instruction comprising:
        when the input instruction includes at least one word that specifies a specific execution device, determining the specific execution device as the at least one second device corresponding to the input instruction, and
        when the input instruction does not include one or more words that specify any specific execution device,
            acquiring information including at least one of user information, environmental information, or device information, and
            determining a device located closest to the user among a plurality of devices as the at least one second device corresponding to the input instruction, based on the acquired information and the input instruction; and
    controlling the at least one second device to perform an operation based on the input instruction.

2. The method of claim 1, wherein the determining of the device located closest to the user among the plurality of devices as the at least one second device corresponding to the input instruction, based on the acquired information and the input instruction, comprises:
    acquiring an intention analysis result corresponding to the input instruction;
    performing fusion processing based on the intention analysis result and the acquired information to obtain a corresponding multi-modal fusion feature representation; and
    determining the at least one second device corresponding to the input instruction based on the multi-modal fusion feature representation and the input instruction.

3. The method of claim 2, wherein the performing of the fusion processing on the intention analysis result and the acquired information to obtain the corresponding multi-modal fusion feature representation comprises:
    connecting the intention analysis result and the acquired information to obtain a multi-modal feature representation; and
    performing attention-weighting processing on the multi-modal feature representation through a feature fusion network, to obtain the corresponding multi-modal fusion feature representation.

4. The method of claim 3, wherein the connecting of the intention analysis result and the acquired information to obtain the multi-modal feature representation comprises:
    determining word vectors corresponding to the intention analysis result and the acquired information; and
    connecting the word vectors to obtain the multi-modal feature representation.

5. The method of claim 3,
    wherein the feature fusion network comprises a plurality of fusion modules;
    wherein at least one of the plurality of fusion modules comprises a multi-head attention layer, a fusion normalization layer, and a fully connected layer;
    wherein the multi-head attention layer is configured to perform attention-weighting processing on an input feature of a fusion module to which the multi-head attention layer belongs;
    wherein the fusion normalization layer is configured to fuse the input feature of the fusion module to which the fusion normalization layer belongs and the attention-weighting processed feature of the multi-head attention layer, and normalize the fusion result; and
    wherein the fully connected layer is configured to perform feature extraction on the normalized processing result, and output the extracted feature.

6. The method of claim 1, wherein the determining of the device located closest to the user among the plurality of devices as the at least one second device corresponding to the input instruction, based on the acquired information and the input instruction, comprises:
    acquiring, by a device selection network, a first contribution of each modal feature corresponding to the acquired information and the input instruction for device selection, and a second contribution of respective word feature corresponding to the input instruction for device selection; and
    determining the at least one second device corresponding to the input instruction based on the respective modal feature, the respective word feature, the first contribution, and the second contribution.

7. The method of claim 6, further comprising:
    acquiring the respective modal feature by:
        acquiring an intention analysis result corresponding to the input instruction;
        performing fusion processing on the intention analysis result and the acquired information to obtain a corresponding multi-modal fusion feature representation; and
        taking respective feature of the multi-modal fusion feature representation as the respective modal feature.

8. The method of claim 6,
    wherein the device selection network comprises a modal feature contribution determination network, a word feature contribution determination network, a classification network, and a device determination network;
    wherein the modal feature contribution determination network is configured to perform attention-weighting on the respective modal feature to obtain respective modal feature including the first contribution;
    wherein the word feature contribution determination network is configured to perform attention-weighting on the respective word feature based on the respective modal feature including the first contribution, to obtain respective word feature including the second contribution;
    wherein the classification network is configured to obtain an output device based on the respective modal feature including the first contribution and the word feature including the second contribution; and
    wherein the device determination network is configured to obtain the at least one second device corresponding to the input instruction based on the output device obtained by the classification network.

9. The method of claim 8,
    wherein the classification network is configured to obtain the output device at least once based on the respective modal feature including the first contribution and the respective word feature including the second contribution; and wherein the device determination network is configured to obtain the at least one second device corresponding to the input instruction according to the output device each time obtained by the classification network.

10. The method of claim 9, wherein the obtaining of the at least one second device corresponding to the input instruction according to the output device each time obtained by the classification network comprises:

if a number of times the output device is obtained by the classification network is one, determining one second device according to probability corresponding to each output device obtained by the classification network; and if the number of times the output device is obtained by the classification network is at least two, determining at least two second devices according to probability corresponding to paths between the respective output devices being obtained at least twice by the classification network.

11. A first device, comprising:
at least one transceiver;
memory storing computer-executable instructions; and
at least one processor operably connected to the at least one transceiver and the memory,
wherein the computer-executable instructions, when executed by the at least one processor individually or collectively, cause the first device to:
acquire an input instruction of a user;
identify whether the input instruction specifies any specific execution device;
determine at least one second device corresponding to the input instruction based on the identification, the determining of the at least one second device corresponding to the input instruction comprising:
when the input instruction includes at least one word that specifies a specific execution device, determine the specific execution device as the at least one second device corresponding to the input instruction, and
when the input instruction does not include one or more words that specify any specific execution device,
acquire information including at least one of user information, environmental information, or device information, and
determine a device located closest to the user among a plurality of devices as the at least one second device corresponding to the input instruction, based on the acquired information and the input instruction; and
control the at least one second device to perform an operation based on the input instruction.

12. The first device of claim 11, wherein to determine the device located closest to the user among the plurality of devices as the at least one second device corresponding to the input instruction, based on the acquired information and the input instruction, the computer-executable instructions, when executed by the at least one processor individually or collectively, further cause the first device to:
acquire an intention analysis result corresponding to the input instruction;
perform fusion processing based on the intention analysis result and the acquired information to obtain a corresponding multi-modal fusion feature representation; and
determine the at least one second device corresponding to the input instruction based on the multi-modal fusion feature representation and the input instruction.

13. The first device of claim 12, wherein to perform the fusion processing on the intention analysis result and the acquired information to obtain a corresponding multi-modal fusion feature representation, the computer-executable instructions, when executed by the at least one processor individually or collectively, further cause the first device to:
connect the intention analysis result and the acquired information to obtain a multi-modal feature representation; and
perform attention-weighting processing on the multi-modal feature representation through a feature fusion network, to obtain the corresponding multi-modal fusion feature representation.

14. The first device of claim 13, wherein to connect the intention analysis result and the acquired information to obtain the multi-modal feature representation, the computer-executable instructions, when executed by the at least one processor individually or collectively, further cause the first device to:
determine word vectors corresponding to the intention analysis result and the acquired information; and
connect the word vectors to obtain the multi-modal feature representation.

15. The first device of claim 13,
wherein the feature fusion network comprises a plurality of fusion modules;
wherein at least one of the plurality of fusion modules comprises a multi-head attention layer, a fusion normalization layer and a fully connected layer;
wherein the multi-head attention layer is configured to perform attention-weighting processing on an input feature of a fusion module to which the multi-head attention layer belongs;
wherein the fusion normalization layer is configured to fuse the input feature of the fusion module to which the fusion normalization layer belongs and the attention-weighting processed feature of the multi-head attention layer, and normalize the fusion result; and
wherein the fully connected layer is configured to perform feature extraction on the normalized processing result, and output the extracted feature.

16. The first device of claim 11, wherein to determine the device located closest to the user among the plurality of devices as the at least one second device corresponding to the input instruction, based on the acquired information and the input instruction, the computer-executable instructions, when executed by the at least one processor individually or collectively, further cause the first device to:
acquire, by a device selection network, a first contribution of each modal feature corresponding to the acquired information and the input instruction for device selection, and a second contribution of respective word feature corresponding to the input instruction for device selection; and
determine the at least one second device of the input instruction based on the respective modal feature, the respective word feature, the first contribution, and the second contribution.

17. One or more non-transitory computer-readable storage media storing computer-executable instructions that, when executed by at least one processor of a first device individually or collectively, cause the first device to perform operations, the operations comprising:
- acquiring an input instruction of a user;
- identifying whether the input instruction specifies any specific execution device;
- determining at least one second device corresponding to the input instruction based on the identification, the determining of the at least one second device corresponding to the input instruction comprising:
  - when the input instruction includes at least one word that specifies a specific execution device, determining the specific execution device as the at least one second device corresponding to the input instruction, and
  - when the input instruction does not include one or more words that specify any specific execution device,
    - acquiring information including at least one of user information, environmental information, or device information, and
    - determining a device located closest to the user among a plurality of devices as the at least one second device corresponding to the input instruction, based on the acquired information and the input instruction; and
- controlling the at least one second device to perform an operation based on the input instruction.

\* \* \* \* \*